US012771939B2

(12) United States Patent
Cho et al.

(10) Patent No.: US 12,771,939 B2
(45) Date of Patent: Oct. 20, 2026

(54) CAMERA MODULE AND ELECTRONIC DEVICE INCLUDING SAME

(71) Applicant: SAMSUNG ELECTRONICS CO., LTD., Suwon-si (KR)

(72) Inventors: Yongsik Cho, Suwon-si (KR); Kwanhyung Kim, Suwon-si (KR); Minook Kim, Suwon-si (KR); Jinmyoung Mok, Suwon-si (KR); Dongjoon Won, Suwon-si (KR); Seunghak Lee, Suwon-si (KR); Younggyu Jung, Suwon-si (KR); Kyungsung Chu, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 209 days.

(21) Appl. No.: 18/784,383

(22) Filed: Jul. 25, 2024

(65) Prior Publication Data

US 2025/0071424 A1 Feb. 27, 2025

(30) Foreign Application Priority Data

Aug. 21, 2023 (KR) ........................ 10-2023-0109340

(51) Int. Cl.
*H04N 23/68* (2023.01)
*G02B 13/00* (2006.01)
*G02B 13/02* (2006.01)
*G02B 15/14* (2006.01)

(52) U.S. Cl.
CPC ....... *H04N 23/687* (2023.01); *G02B 13/0045* (2013.01); *G02B 13/0065* (2013.01); *G02B 13/009* (2013.01); *G02B 13/02* (2013.01); *G02B 15/142* (2019.08)

(58) Field of Classification Search
None
See application file for complete search history.

(56) References Cited

U.S. PATENT DOCUMENTS 6,853,493 B2 2/2005 Kreitzer
9,146,388 B2 9/2015 Kimura
9,316,810 B2 4/2016 Mercado
(Continued)

FOREIGN PATENT DOCUMENTS

CN 110730295 1/2020
CN 110913101 3/2020
(Continued)

*Primary Examiner* — Michael H Caley
(74) *Attorney, Agent, or Firm* — Fish & Richardson P.C.

(57) ABSTRACT

A camera module and an electronic device include the camera module having a first lens group including at least one lens, a reflection member configured such that light incident from the first lens group in a first direction is reflected by the reflection member in a second direction crossing the first direction, a second lens group arranged in the second direction and including at least three lenses, and an image sensor configured to receive an optical signal passing through the second lens group and generate an electrical signal related to an image based on the optical signal, wherein the camera module satisfies $1.2<|f1/f|<3$, where f1 refers to a focal length of the first lens group, and f refers to a total focal length of an optical system including the first lens group and the second lens group.

17 Claims, 13 Drawing Sheets

(56) References Cited

U.S. PATENT DOCUMENTS

| | | | |
|---|---|---|---|
| 9,557,627 B2 | 1/2017 | Mercado | |
| 10,234,659 B2 | 3/2019 | Yao et al. | |
| 10,437,023 B2 | 10/2019 | Yao et al. | |
| 11,054,615 B2 | 7/2021 | Lee | |
| 2007/0064315 A1* | 3/2007 | Kobayashi | G02B 13/006 359/689 |
| 2008/0062531 A1* | 3/2008 | Kim | G02B 15/144513 359/676 |
| 2009/0005112 A1 | 1/2009 | Sorek et al. | |
| 2011/0261167 A1 | 10/2011 | Shin | |
| 2019/0058828 A1* | 2/2019 | Russi-Vigoya | H04N 23/58 |
| 2020/0174233 A1* | 6/2020 | Iwamoto | G02B 9/10 |
| 2021/0044729 A1 | 2/2021 | Wang et al. | |
| 2021/0157107 A1 | 5/2021 | Pentico | |
| 2021/0165192 A1 | 6/2021 | Shabtay et al. | |
| 2021/0294074 A1 | 9/2021 | Yao et al. | |
| 2021/0382269 A1 | 12/2021 | Saiga | |
| 2022/0075160 A1 | 3/2022 | Yin | |
| 2023/0164415 A1* | 5/2023 | Hegels | G02B 27/646 348/335 |
| 2023/0359006 A1 | 11/2023 | Obikane | |
| 2024/0012226 A1 | 1/2024 | Chiang et al. | |

FOREIGN PATENT DOCUMENTS

| | | | |
|---|---|---|---|
| CN | 110995965 | 4/2020 | |
| CN | 111610618 A * | 9/2020 | G02B 13/0065 |
| CN | 107436482 | 5/2021 | |
| CN | 112859290 | 5/2021 | |
| CN | 112904529 | 6/2021 | |
| CN | 113608335 | 11/2021 | |
| CN | 114258505 | 3/2022 | |
| CN | 114302048 | 4/2022 | |
| CN | 114467047 | 5/2022 | |
| CN | 217932273 U | 11/2022 | |
| KR | 10-0906851 | 7/2009 | |
| KR | 10-2022-0033405 | 3/2022 | |
| WO | WO 2019205653 | 10/2019 | |
| WO | WO 2022170955 | 8/2022 | |
| WO | WO 2022222085 | 10/2022 | |

* cited by examiner

CAMERA MODULE AND ELECTRONIC DEVICE INCLUDING SAME

CROSS-REFERENCE TO RELATED APPLICATION

This application claims priority from Korean Patent Application No. 10-2023-0109340, filed in the Korean Intellectual Property Office on Aug. 21, 2023, the disclosure of which is incorporated by reference herein in its entirety.

BACKGROUND

Folded optics are useful for increasing or extending the focal length of a small electronic device, including a plurality of camera modules. For example, a folded camera includes a reflection member, such as a prism, such that the arrangement or arrangement direction of lenses may be freely designed regardless of the direction in which light is incident from the outside, thereby making it easy to extend a focal length. The degree of design freedom regarding the arrangement direction of lenses in folded cameras has improved. Accordingly, small telephoto cameras may be implemented using folded cameras, and folded cameras may be combined with wide-angle cameras that may be included in electronic devices. In general, when cameras include hand tremor correction devices (optical image stabilizers), the quality of images captured using the cameras may be improved, and when telephoto cameras used to capture images of distant objects have a hand tremor correction function (image stabilization function), the performance of the telephoto cameras may be greatly improved.

When a small and/or lightweight electronic device includes a camera having an image stabilization function, high power efficiency may be secured while saving an installation space. However, when a camera having a combination of a telephoto function and an image stabilization function is installed in a small electronic device, it may be difficult to secure an installation space.

SUMMARY

In general, in some aspects, the present disclosure is directed toward a camera module having a predetermined brightness, a focus control function, and a hand tremor correction function (image stabilization function), and an electronic device including the camera module.

According to some aspects of the present disclosure, a camera module includes a first lens group including at least one lens, a reflection member configured such that light incident from the first lens group in a first direction is reflected by the reflection member in a second direction crossing the first direction, a second lens group arranged in the second direction and including at least three lenses, and an image sensor configured to receive an optical signal passing through the second lens group and generate an electrical signal related to an image based on the optical signal, wherein the camera module satisfies $1.2<|f1/f|<3$ where f1 refers to a focal length of the first lens group, and f refers to a total focal length of an optical system including the first lens group and the second lens group.

According to some aspects of the present disclosure, a camera module includes a first lens group arranged in a first direction parallel to a side of an object and including a first lens and a second lens, a reflection member configured such that light incident in the first direction is reflected by the reflection member in a second direction crossing the first direction, a second lens group arranged in the second direction and including a third lens, a fourth lens, and a fifth lens, and an image sensor configured to detect light passing through the second lens group, wherein the camera module satisfies $1<|f2/f|<2$ where f2 refers to a focal length of the second lens group, and f refers to a total focal length of an optical system including the first lens group and the second lens group.

According to some aspects of the present disclosure, an electronic device includes a plurality of camera modules including a first camera module having a first field of view and a second camera module having a second field of view that is different from the first field of view. The first camera module includes a first lens group arranged in a first direction and including at least two lenses, a reflection member configured such that light incident in the first direction is reflected by the reflection member in a second direction crossing the first direction, a second lens group arranged in the second direction and including at least three lenses, and an image sensor configured to receive an optical signal passing through the second lens group and generate an electrical signal related to an image based on the optical signal, wherein the first camera module satisfies $1.2<|f1/f|<3$ where f1 refers to a focal length of the first lens group, and f refers to a total focal length of an optical system including the first lens group and the second lens group.

BRIEF DESCRIPTION OF THE DRAWINGS

The subject matter of the present disclosure will be more clearly understood from the following detailed description, taken in conjunction with the accompanying drawings.

DETAILED DESCRIPTION

Hereinafter, example implementations will be described in detail with reference to the accompanying drawings.

Figure 1:
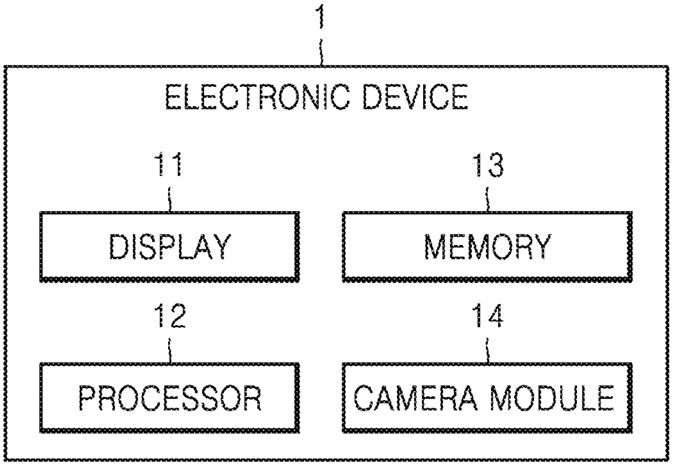
FIG. 1 is a block diagram illustrating an example of an electronic device according to some implementations.

FIG. 1 is a block diagram illustrating an example of an electronic device according to some implementations. In FIG. 1, an electronic device 1 includes a display 11, a processor 12, a memory 13, and a camera module 14. In some implementations, cameras of the camera module 14 may be cameras included in the electronic device 1. The display 11, the processor 12, the memory 13, and the camera module 14 may be electrically connected to each other and may exchange signals, such as commands and/or data, with each other. The electronic device 1 may be of various types. For example, in some implementations, the electronic device 1 may include a portable communication device, such as a smartphone, a portable multimedia device, a portable medical device, a wearable device, or the like. However, electronic device 1 is not limited to the devices described above.

The processor 12 may include at least one processor. For example, the processor 12 may include at least one of an application processor (AP), an image signal processor (ISP), and a communication processor (CP). The processor 12 may control the camera module 14, and may support various functions using the camera module 14. The processor 12 may control the camera module 14 to obtain captured content from the camera module 14. The processor 12 may store captured content acquired through the camera module 14 in the memory 13 or process the captured content in real time. In some implementations, the processor 12 may control the display 11, and may display captured content on the display 11. For example, while an application, such as a camera application or a photography application, is running, captured content may be displayed within an application execution screen. According to some implementations, the processor 12 may control an optical image stabilizer (OIS) driving unit, a lens driving actuator, a lens control unit, and an aperture stop driving module of the camera module 14.

The processor 12 may execute applications and control various types of hardware by executing code that is written in a programming language and stored in the memory 13 of the electronic device 1. For example, the processor 12 may execute an application, such as a camera application or a photography application, and display captured content or a user interface (UI) related to the captured content on an application execution screen. As instructions stored in the memory 13 are executed, the processor 12 may operate.

In some implementations, the electronic device 1 may include a plurality of camera modules 14 having different characteristics or functions. For example, at least one of the camera modules 14 may be a wide-angle camera, and at least one of the other camera modules 14 may be a telephoto camera. In some implementations, at least one of the camera modules 14 may be a front camera, and at least one of the other camera modules 14 may be a rear camera. For example, the camera modules 14 may have different fields of view. For example, a first camera module may have the narrowest field of view and a second camera module may have the widest field of view. As described above, the camera modules 14 may be designed to have different fields of view. In this case, images of objects (subjects) may be captured at various depths, and a zoom function may be implemented. In addition, the thickness of the electronic device 1 may not increase even when the electronic device 1 has a great zoom magnification. In addition, high-resolution images or bright images may be generated by using compositing of a plurality of images of one object. Since it is possible to generate bright images, clear images of objects may be captured even in low-illumination environments. In addition, according to some implementations, the total length of the camera modules 14 may not affect the thickness of the electronic device 1, and the camera modules 14 may be miniaturized. The camera modules 14 are not limited to the implementations described above and may be variously configured in various implementations.

Figure 2:
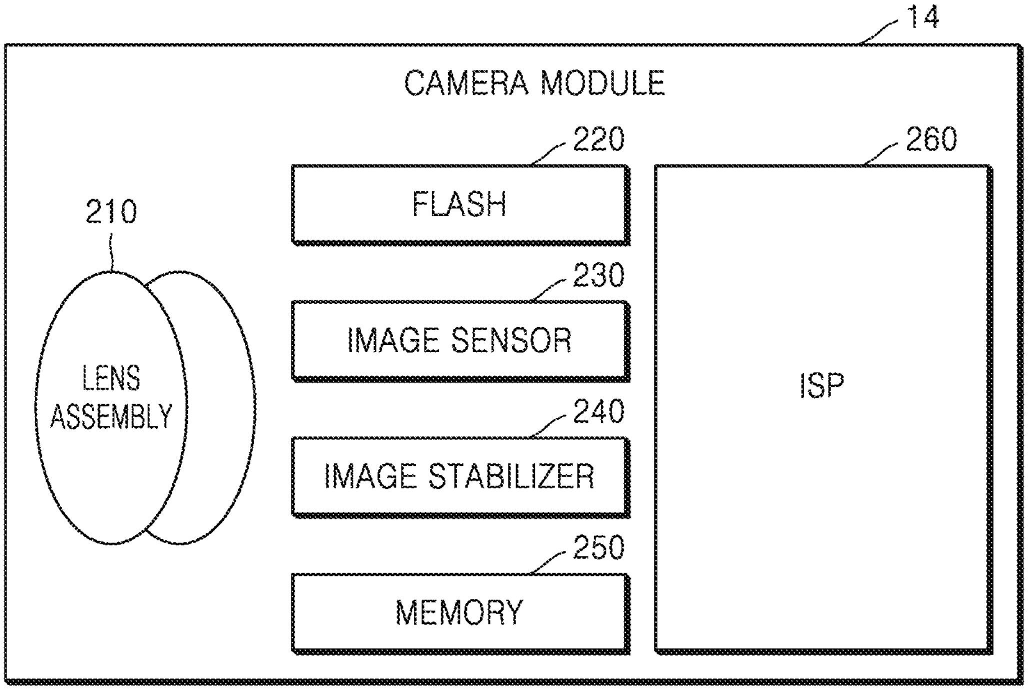
FIG. 2 is a block diagram illustrating an example of a camera module according to some implementations.

FIG. 2 is a block diagram illustrating an example of a camera module according to some implementations. In FIG. 2, a camera module 14 includes a lens assembly 210, a flash 220, an image sensor 230, an image stabilizer 240, a memory 250, such as a buffer memory, and an ISP 260. The lens assembly 210 may collect light emitted from an object to be photographed, and may include one or more lenses. In some implementations, the camera module 14 may include a plurality of lens assemblies 210 that include a first lens group and a second lens group. For example, the camera module 14 may form a dual camera, a 360-degree camera, or a spherical camera. In some implementations, the lens assemblies 210 may have the same lens characteristics, such as the same field of view, focal length, autofocus, f number, or optical zoom. In some implementations, at least one of the lens assemblies 210 may have one or more lens characteristics that are different from the lens characteristics of the other lens assemblies 210. In some implementations, the lens assemblies 210 may include a wide-angle lens or a telephoto lens. For example, the lens assemblies 210 may include a zoom lens, an OIS driving unit, a focus lens configured to vary the position of a focal point, a lens driving actuator, or the like. The zoom lens and the focus lens may be formed as a lens group by combining a plurality of lenses with each other, and the lens driving actuator may adjust a focal point by moving the focus lens in an optical axis direction.

The lens assemblies 210 may include a folded optical system, and the second lens group included in the lens assemblies 210 may be implemented parallel to the length or width direction of an electronic device for focus control. Accordingly, it is possible to easily adjust a telephoto function, a macro function, and lens brightness without substantially affecting the thickness of the electronic device.

The image stabilizer 240 may include an autofocus (AF) device, a gyro sensor, and an OIS driving unit. The AF and the gyro sensors may collect information on AF and hand tremors. The OIS driving unit may drive the lens assemblies 210 in AF/OIS mode based on information collected by the AF and the gyro sensor.

The image stabilizer 240 may move at least one lens included in the lens assemblies 210 or the image sensor 230 in a specific direction or control operational characteristics, such as read-out timing, of the image sensor 230 in response to a movement of the camera module 14 or an electronic device including the camera module 14. This compensates for at least some of the negative effects of the movement on captured images. In some implementations, the image stabilizer 240 may detect movements of the camera module 14 or an electronic device by using the gyro sensor or an acceleration sensor disposed inside or outside the camera module 14. In some implementations, the image stabilizer 240 may be implemented as an OIS, for example.

The image stabilizer 240 may obtain a high-quality telephoto image through a hand tremor correction function (image stabilization function) implemented by rotating or tilting the first lens group and a reflection member that are included in the lens assemblies 210.

In some implementations, the memory 250 may temporarily store at least a portion of an image acquired through the image sensor 230 for a next image processing operation. For example, when image acquisition is delayed due to a shutter, or a plurality of images are acquired at high speed, acquired original images, such as Bayer-patterned images or high-resolution images, may be stored in the memory 250, and copies thereof, such as low-resolution images, may be previewed on a display module. When a designated condition, such as a user input or system command, is satisfied, the ISP 260 may obtain and process at least portions of the original images stored in the memory 250. In some implementations, the memory 250 may be at least a portion of the memory 13 or a separate memory that operates independently of the memory 13.

In FIG. 2, the ISP 260 may perform at least one image process on an image acquired through the image sensor 230 or an image stored in the memory 250. The at least one image process may include, for example, depth map creation, three-dimensional modeling, panorama creation, feature point extraction, image compositing, or image compensation, such as noise reduction, resolution adjustment, brightness adjustment, blurring, sharpening, or softening. In some implementations, the ISP 260 may perform control, such as exposure time control or read-out timing control, on at least one of the components included in the camera module 14, such the image sensor 230. In some implementations, the image processed by the ISP 260 may be stored back in the memory 250 for additional processing, and in some implementations may be stored in an external component, such as the memory 13, the display 11, the electronic device 1, or a server, provided outside the camera module 14. In some implementations, the ISP 260 may be configured as at least a portion of the processor 12, and in some implementations may be configured as a separate processor that operates independently of the processor 12. When the ISP 260 is configured as a processor separate from the processor 12, at least one image processed by the ISP 260 may or may not be additionally processed by the processor 12 and may then be displayed on the display 11.

Figure 3:
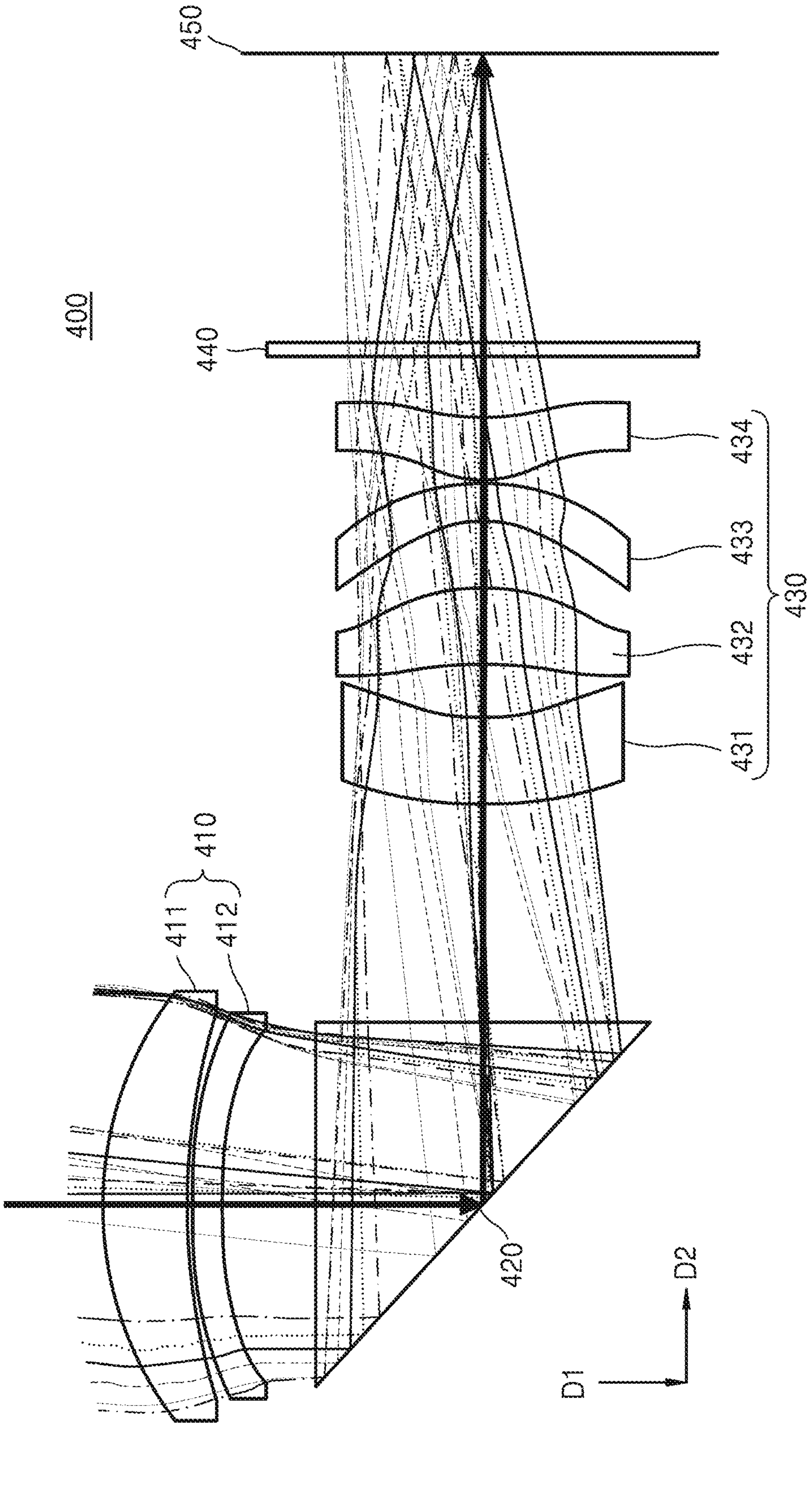
FIG. 3 is a layout diagram illustrating an example of an optical structure of a camera module according to some implementations.

FIG. 3 is a layout diagram illustrating an example of an optical structure of a camera module 400 according to some implementations. In FIG. 3, the camera module 400, such as a folded camera, includes a first lens group 410, a reflection member 420, a second lens group 430, and an image sensor 450. The camera module 400 may further include an infrared cut-off filter 440 between the second lens group 430 and the image sensor 450.

In some implementations, the first lens group 410 may include at least one lens. For example, the first lens group 410 may include a plurality of lenses. In some implementations, the first lens group 410 may include a first lens 411 and a second lens 412. For example, the first lens 411 may have positive refractive power and the second lens 412 may have negative refractive power. The first lens 411 may be placed adjacent to an object to be imaged, and the second lens 412 may be placed adjacent to the reflection member 420. In some implementations, the first lens group 410 may be positioned on an object side and may be aligned with the reflection member 420 in a first direction D1. In addition, the first lens group 410 may be moved to correct image shaking caused by disturbance acting on the camera module 400, as described below with reference to FIG. 6.

In some implementations, the reflection member 420 may reflect light passing through the first lens group 410 at a predetermined angle. For example, the predetermined angle may be about 90 degrees. In some implementations, the reflection member 420 may reflect incident light toward the second lens group 430 and the image sensor 450. For example, the reflection member 420 may include a prism or a mirror, and light incident in the first direction D1 may be reflected by the reflection member 420 in a second direction D2 crossing the first direction D1.

In FIG. 3, the first direction D1 may refer to a direction in which light is incident from the outside on the electronic device 1 (in FIG. 1) or the camera module 400 when an object (subject) is photographed. In some implementations, the first direction D1 may refer to a shooting direction, a subject direction, a direction of orientation of the camera module 400, or a direction parallel thereto, and the second direction D2 may be parallel to the length or width direction of the electronic device 1 (in FIG. 1). When the second direction D2 is perpendicular to the first direction D1, the camera module 400 or an optical path may be easily designed.

In some implementations, the reflection member 420 may be aligned with the first lens group 410 in the first direction D1 and the second lens group 430 in the second direction D2. A reflection surface of the reflection member 420 may include a point at which light incident in the first direction D1 is refracted or a point at which the first direction D1 and the second direction D2 cross each other. An entrance surface of the reflection member 420 may face the first lens group 410 when viewed in the first direction D1, and an exit surface of the reflection member 420 may face the second lens group 430 when viewed in the second direction D2. In some implementations, the entrance surface and the exit surface may form an angle of substantially 90 degrees. In some implementations, the reflection member 420 may be moved to correct image shaking caused by disturbance acting on the camera module 400, as will be described below with reference to FIG. 4.

In some implementations, the second lens group 430 may include at least three lenses. For example, the second lens group 430 may include a third lens 431, a fourth lens 432, and a fifth lens 433. In some implementations, the second lens group 430 may further include a sixth lens 434 that is closer to the image sensor 450 than the fifth lens 433 is to the image sensor 450. For example, the third lens 431 may have negative refractive power, the fourth lens 432 may have positive refractive power, the fifth lens 433 may have positive refractive power, and the sixth lens 434 may have positive refractive power. The third lens 431 may be disposed adjacent to the reflection member 420, and the sixth lens 434 may be disposed adjacent to the image sensor 450.

In some implementations, the second lens group 430 may be arranged such that the reflection member 420, the infrared cut-off filter 440, and the image sensor 450 may be arranged in the second direction D2. The second lens group 430 may be arranged between the reflection member 420 and the image sensor 450 (or the infrared cut-off filter 440) when viewed in the second direction D2. For example, the reflection member 420, the second lens group 430, the infrared cut-off filter 440, and the image sensor 450 may be sequentially arranged in the second direction D2. In an embodiment, the second lens group 430 may be moved to adjust a focal length according to an AF or macro operation, as will be described below with reference to FIG. 5.

In some implementations, the image sensor 450 may be aligned in the second direction D2, and may generate an electrical signal based on a received optical signal. For example, the image sensor 450 may generate an electrical signal from an optical signal by detecting light passing through the infrared cut-off filter 440. In some implementations, when the camera module 400 performs an image stabilization function, the first lens group 410 and the reflection member 420 may be moved, and the position of an image formed on the image sensor 450 may vary depending on the movements of the first lens group 410 and the reflection member 420.

The infrared cut-off filter 440 may block light in an infrared or near-infrared wavelength band. Accordingly, light in the infrared or near-infrared wavelength band may not be incident on the image sensor 450. The infrared cut-off filter 440 may be at any position in an optical path between the second lens group 430 and the image sensor 450. In some implementations, the infrared cut-off filter 440 may be disposed close to the image sensor 450, and visual exposure of the infrared cut-off filter 440 to the outside may be suppressed or prevented.

In some implementations, the camera module 400 may satisfy Equation 1 below.

$$1.2 < \left|\frac{f1}{f}\right| < 3 \quad \text{Equation 1}$$

In Equation 1, f may refer to the focal length, such as composite focal length, of an entire optical system including the first lens group 410 and the second lens group 430, and f1 may refer to the focal length of the first lens group 410. According to Equation 1, the size of the second lens group 430 arranged in the second direction D2 may be reduced by limiting the refractive power of the first lens group 410 with respect to the refractive power of the entire optical system.

In addition, according to some implementations, the camera module 400 may satisfy Equation 2 below.

$$1 < \left|\frac{f2}{f}\right| < 2 \quad \text{Equation 2}$$

In Equation 2, f may refer to the focal length, such as a composite focal length, of the entire optical system including the first lens group 410 and the second lens group 430, and f2 may refer to the focal length of the second lens group 430. According to Equation 2, the refractive power of the second lens group 430 may be limited with respect to the refractive power of the entire optical system, and the moving distance of the second lens group 430 for varying a focal length may be limited to a specified range.

In some implementations, the first to sixth lenses 411, 412, and 431 to 434 that are included in the first lens group 410 and the second lens group 430 may have an aspherical surface as a lens surface. The first to sixth lenses 411, 412, and 431 to 434 may include glass or a plastic material. The aspherical surface of a lens may be expressed by Equation 3 below.

$$z = \frac{cr^2}{1 + \sqrt{(1 - (1 - k)c^2r^2}} + Ar^4 + Br^6 + Cr^6 + Dr^{10} + Er^{12} + Fr^{14} + Gr^{16} + Hr^{18} + Jr^{20} \quad \text{Equation 3}$$

In Equation 3, c may refer to the reciprocal of the radius of curvature of the lens, k may refer to a conic constant, r may refer to the distance from any point on the aspherical surface to an optical axis, A to J may refer to aspherical constants, and z may refer to the height in the direction of the optical axis from any point on the aspherical surface to the vertex of the aspherical surface.

Figure 4:
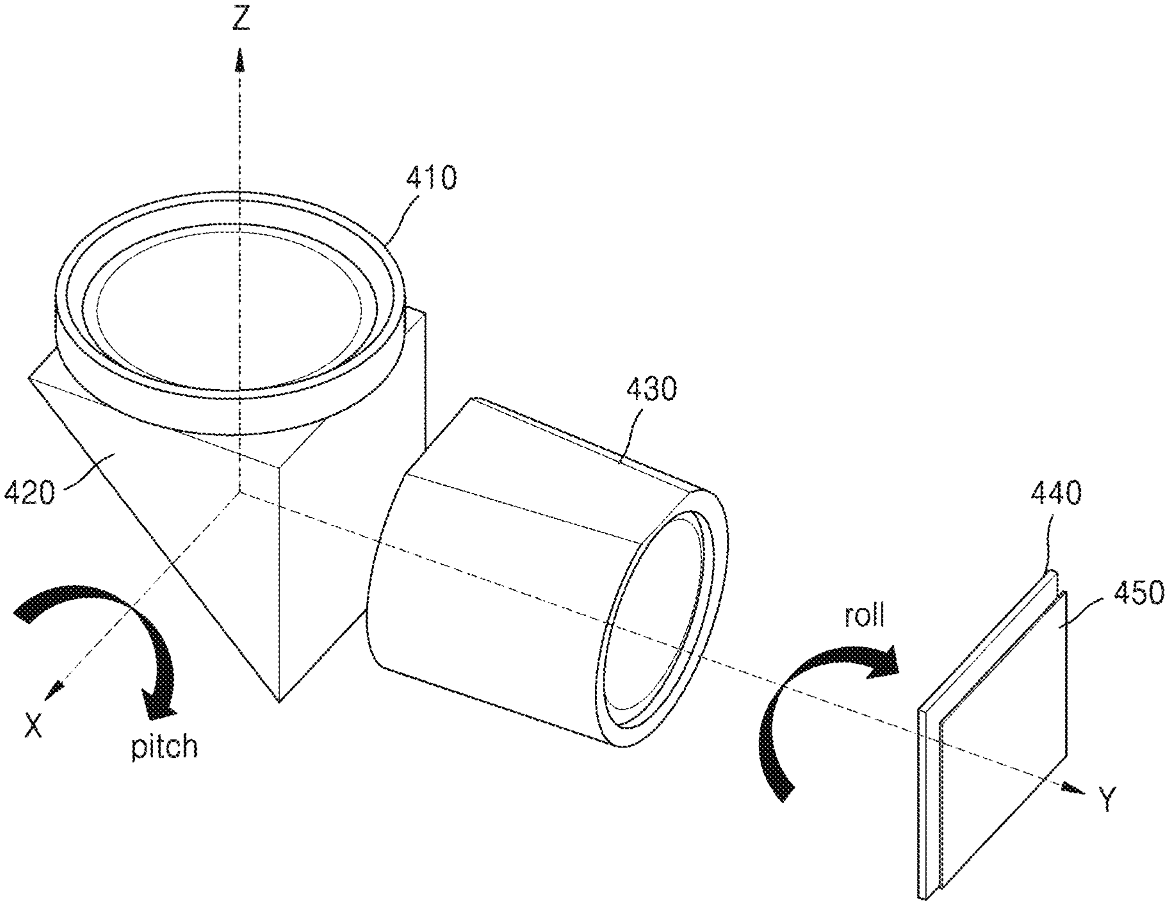
FIG. 4 is a diagram illustrating examples of movements of a first lens group and a reflection member of a camera module according to some implementations.

FIG. 4 is a diagram illustrating examples of movements of the first lens group 410 and the reflection member 420 of the camera module 400 according to some implementations. In FIG. 4, the camera module 400 adjusts the first lens group 410 and the reflection member 420 to correct image quality degradation caused by disturbance (for example, mechanical vibration). The position of an image formed on the image sensor 450 may vary as the first lens group 410 and the reflection member 420 rotate.

For example, the first lens group 410 and the reflection member 420 may rotate about a rotation axis that is parallel to an X-axis. An operation in which the first lens group 410 and the reflection member 420 rotate or tilt about the X-axis may be referred to as pitch.

In addition, the first lens group 410 and the reflection member 420 may rotate around a rotation axis parallel to a Y-axis. An operation in which the first lens group 410 and the reflection member 420 rotate or tilt about the Y-axis may be referred to as roll. The first lens group 410 and the reflection member 420 rotate or tilt about the X-axis and/or the Y-axis to improve hand tremor correction (OIS operation), thereby reducing deterioration in image resolution.

Figure 5:
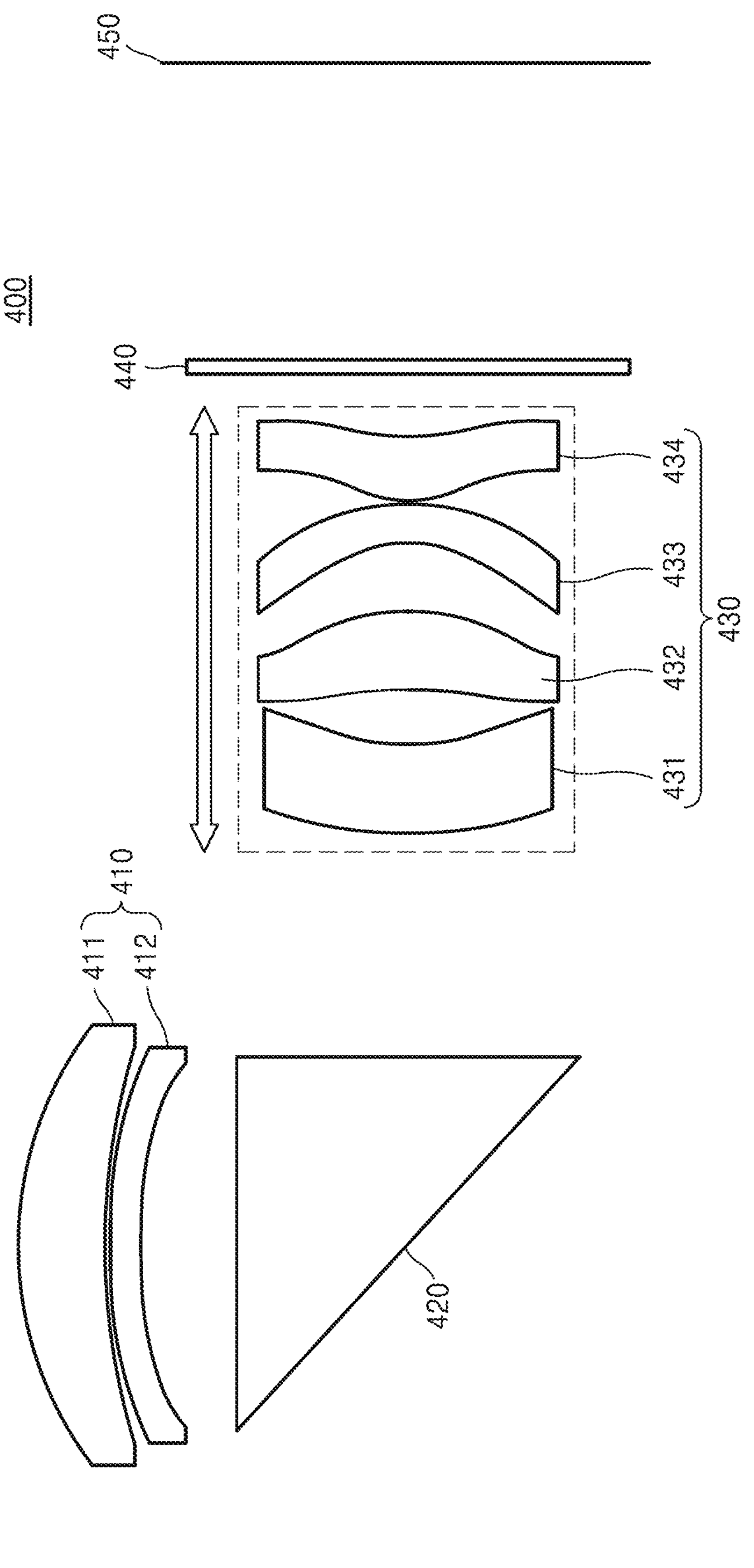
FIG. 5 is a diagram illustrating an example of movement of a second lens group of a camera module according to some implementations.

FIG. 5 is a diagram illustrating an example of movement of the second lens group 430 of the camera module 400 according to some implementations. In FIG. 5, the camera module 400 adjusts the position of a focal point by moving the second lens group 430 or at least some of the third to sixth lenses 431 to 434 included in the second lens group 430 in the second direction D2. For example, in some implementations, the second lens group 430 may move as a whole, or the third to sixth lenses 431 to 434 included in the second lens group 430 may individually move.

According to some implementations, when an OIS operation is performed, the image sensor 450 may be shifted in the length or width direction of the electronic device 1 (in FIG. 1). Accordingly, when the electronic device 1 has a small thickness, the size of the image sensor 450 may easily be increased, and/or a space for an OIS operation may be easily secured. In some implementations, when the camera module 400 is used as a telephoto camera, the quality of captured images may be improved by imparting an OIS function to the camera module 400, and the performance of the camera module 400 may be improved by increasing the size of the image sensor 450. The second lens group 430 may be linearly moved (or shifted) in the second direction D2 to adjust a focal length according to the position of an object. Small electronic devices, such as smartphones, have a thickness of about 10 mm, and the range in which a lens moves linearly in the thickness direction of such a small electronic device may be limited.

Figure 6:
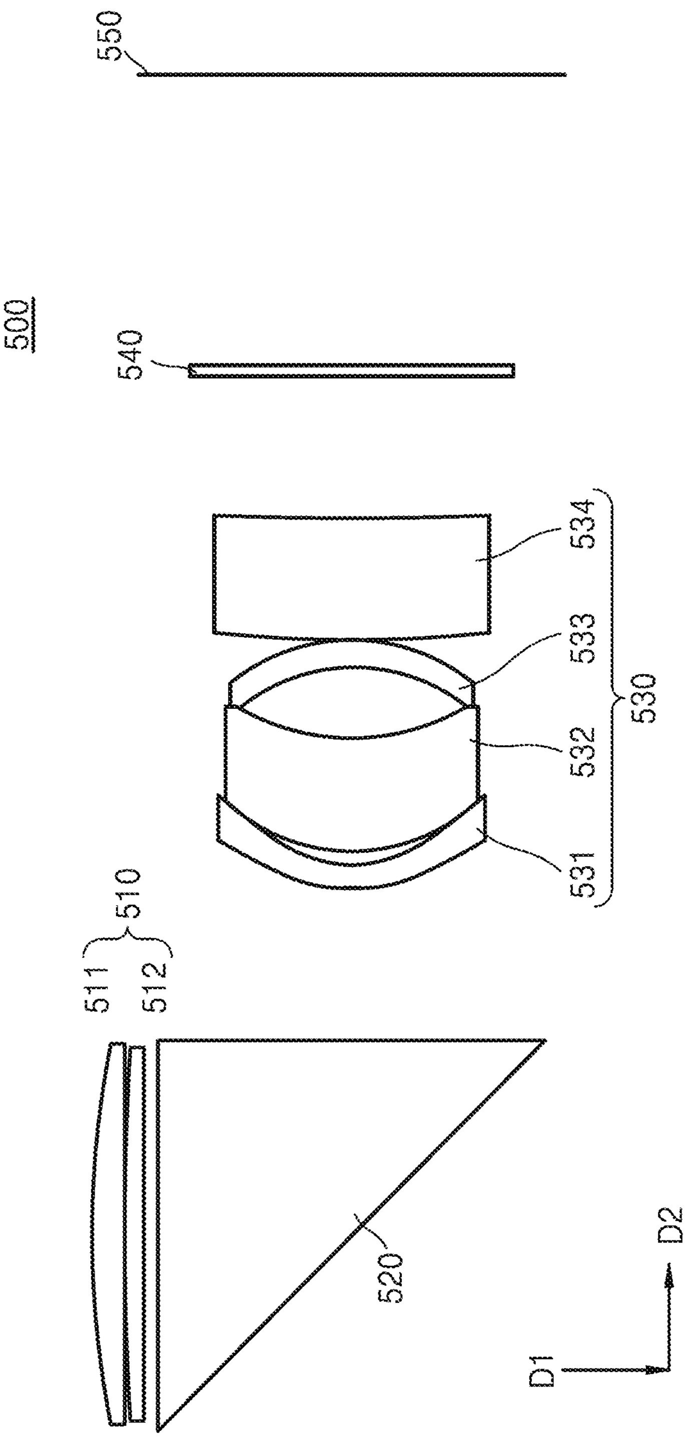
FIG. 6 is a diagram illustrating an example of an optical system of a camera module according to some implementations.

FIG. 6 is a diagram illustrating an example of an optical system of a camera module 500 according to some implementations. In FIG. 6, the diagonal length of an image surface or active area of an image sensor 550 (hereinafter the size of the image sensor 550) may be about ½ inch (or about 8 mm), the camera module 500 may have a zoom magnification of about 3× and an f number (Fno) of about 2.67, and the camera module 500 may have a macro distance of about 200 mm.

When a focus adjustment function, such as an AF function, of the camera module 500 is performed, a second lens group 530 may move in a second direction D2. Accordingly, the focal point of the optical system of the camera module 500 may vary. In addition, the camera module 500 may perform an image stabilization function by rotating a first lens group 510 and a reflection member 520 in response to disturbance, such as hand tremor or mechanical vibration.

Table 1 shows data on the optical system of the camera module 500 according to some implementations.

TABLE 1

| Surface | Lens | Radius (radius of curvature, mm) | Thickness 1 (mm) | Thickness 2 (mm) | Nd (refractive index) | Vd (Abbe number) | Y Aperture | Focal Length |
|---|---|---|---|---|---|---|---|---|
| S1 | 1P | 16.52757 | 0.625896 | 0.625896 | 1.545785 | 55.99007 | 3.87201945 | 33.8254774 |
| S2 | | 155.6691 | 0.061839 | 0.061839 | | | 3.82467182 | |
| S3 | 2P | 912.7783 | 0.35 | 0.35 | 1.536786 | 55.70981 | 3.80624235 | −405.361637 |
| S4 | | 175.6832 | 0.3 | 0.3 | | | 3.74473496 | |
| S5 | Prism | 1E+18 | 7.9 | 7.9 | 1.518274 | 64.16641 | 5.22569556 | 1E+35 |
| S6 | | 1E+18 | 3.102006 | 2.139865 | 0 | | 3.16232767 | |
| S7 | 3P | 2.885968 | 0.477645 | 0.477645 | 1.676944 | 19.23797 | 2.73112426 | −15.0175911 |
| S8 | | 2.097664 | 0.302877 | 0.302877 | 0 | | 2.55144676 | |
| S9 | 4P | 3.37343 | 2.277443 | 2.277443 | 1.536786 | 55.70981 | 2.56757801 | 10.9317415 |
| S10 | | 6.064095 | 1.442138 | 1.442138 | 0 | | 2.31287313 | |
| S11 | 5P | −2.34703 | 0.547494 | 0.547494 | 1.676944 | 19.23797 | 2.32752341 | −16.7748087 |
| S12 | | −3.2371 | 0.050487 | 0.050487 | 0 | | 2.47543162 | |
| S13 | 6P | 6.690206 | 2.5 | 2.5 | 1.655726 | 21.53625 | 2.63663656 | 13.0298415 |
| S14 | | 26.27139 | 2.85 | 2.85 | 0 | | 2.80056209 | |
| S15 | Filter | 1E+18 | 0.21 | 0.21 | 1.518274 | 64.16641 | 3.26208062 | 1E+35 |
| S16 | | 1E+18 | −5.93933 | −6.90147 | | | 3.28526131 | |
| Si | | 1E+18 | 0.027323 | | | | 4.35 | |

In Table 1, Thickness 1 and Thickness 2 given as positive numbers may refer to being positioned in a first direction D1, and given as negative numbers may referring to being positioned in the second direction D2.

In Table 1, S1 refers to an object-side surface of a first lens 511 included in the first lens group 510 and S2 refers to an image-side surface of the first lens 511. S3 refers to an object-side surface of a second lens 512 included in the first lens group 510, and S4 refers to an image-side surface of the second lens 512. S5 and S6 respectively refer to an entrance surface and an exit surface of the reflection member 520. S7 refers to an object-side surface of a third lens 531 included in the second lens group 530, and S8 refers to an image-side surface of the third lens 531. S9 refers to an object-side surface of a fourth lens 532 included in the second lens group 530, and S10 refers to an image-side surface of the fourth lens 532. S11 refers to an object-side surface of the fifth lens 533 included in the second lens group 530, and S12 refers to an image-side surface of the fifth lens 533. S13 refers to an object-side surface of a sixth lens 534 included in the second lens group 530, and S14 refers to an image-side surface of the sixth lens 534. Si refers to a surface of the image sensor 550.

In some implementations, aspherical coefficients of lenses may be expressed as shown in Table 2 below. The aspherical coefficients may be calculated based on Equation 3 described above.

TABLE 2

| Surface | K | A | B | C | D | E | F | G | H | J |
|---|---|---|---|---|---|---|---|---|---|---|
| S1 | −5.45512 | −0.0005 | 0.000165 | −5E−05 | 1.05E−05 | −1.5E−06 | 1.36E−07 | −7.7E−09 | 2.45E−10 | −3.3E−12 |
| S2 | 99 | −0.0002 | 0.00026 | −0.00013 | 2.73E−05 | −3E−06 | 1.77E−07 | −4.9E−09 | 2.94E−11 | 7.32E−13 |
| S3 | 0 | 0.001142 | −0.00022 | 4.4E−05 | −4.9E−05 | 2.59E−05 | −7.7E−06 | 1.51E−06 | −2.1E−07 | 2.06E−08 |
| S4 | −99 | 0.000522 | −9.7E−05 | −6.1E−05 | 3.01E−05 | −6.3E−06 | 5.11E−07 | 6.82E−08 | −2.6E−08 | 3.65E−09 |
| S5 | 0 | 0 | 0 | 0 | 0 | 0 | 0 | 0 | 0 | 0 |
| S6 | 0 | 0 | 0 | 0 | 0 | 0 | 0 | 0 | 0 | 0 |
| S7 | −3.02176 | −0.00173 | 0.000205 | −1.7E−05 | 1.02E−05 | −5.6E−06 | 1.62E−06 | −2.5E−07 | 1.97E−08 | −6.1E−10 |
| S8 | −2.4539 | −0.00719 | 0.000867 | −0.0003 | 0.000127 | −5.3E−05 | 1.55E−05 | −2.6E−06 | 2.29E−07 | −7.9E−09 |
| S9 | 0.334217 | 0.004813 | −0.00059 | 3.88E−05 | 2.65E−06 | 1.79E−06 | 4.06E−08 | −3.6E−08 | −2.9E−09 | 7.08E−10 |
| S10 | 1.577849 | −0.00292 | −0.00027 | 1.64E−05 | −9.1E−06 | 3.18E−06 | −2.7E−07 | −4E−08 | 7.61E−09 | −2.1E−10 |
| S11 | −6.61437 | 0.005142 | −0.00138 | 0.000591 | −0.00018 | 3.12E−05 | −3.3E−06 | 2.28E−07 | −1.8E−09 | −1.3E−10 |
| S12 | −1.88782 | −0.00393 | 0.001991 | −0.00037 | 3.22E−05 | −1.9E−06 | −4.9E−09 | 3.15E−08 | 1.04E−09 | −3.5E−10 |
| S13 | −0.38877 | 0.03085 | −0.01233 | 0.005248 | −0.00162 | 0.000109 | 0.00019 | −0.00012 | 3.7E−05 | −7.7E−06 |
| S14 | 73.38029 | 0.004586 | 0.000798 | −0.00183 | 0.001899 | −0.00131 | 0.000632 | −0.00022 | 5.51E−05 | −1E−05 |
| S15 | −6.61437 | 0.005142 | −0.00138 | 0.000591 | −0.00018 | 3.12E−05 | −3.3E−06 | 2.28E−07 | −1.8E−09 | −1.3E−10 |
| S16 | 0 | 0 | 0 | 0 | 0 | 0 | 0 | 0 | 0 | 0 |
| Si | 0 | 0 | 0 | 0 | 0 | 0 | 0 | 0 | 0 | 0 |

In Table 2, K may refer to a conic constant, and A to J may refer to aspherical constants.

In some implementations, the optical system of the camera module 500 may satisfy Tables 3 and 4 below.

TABLE 3

| | |
|---|---|
| EFL | 20.2 |
| Fno | 2.673627 |
| HFOV | 6.874095 |
| NPmax | 1.545785 |
| V1/N1 | 36.22112 |
| V2/N2 | 36.25085 |
| V3/N3 | 42.26273 |
| V4/N4 | −42.2627 |
| V5/N5 | −11.472 |
| V6/N6 | −36.2508 |
| V7/N7 | −11.472 |

TABLE 4

| | |
|---|---|
| f/f1 | 0.597183 |
| f/f2 | −0.04983 |
| f/f3 | −1.34509 |
| f/f4 | 1.84783 |
| f/f5 | −1.20419 |
| f/f6 | 1.550287 |
| g1 | 50.98 |
| g2 | −34.18 |
| \| g1/f \| | 2.523 |
| \| g2/f \| | 1.69 |

In Table 3, EFL may refer to an effective focal length and Fno may refer to an aperture value (f number). In Table 4, f may refer to the focal length of the optical system including the first lens group 510 and the second lens group 530, f1 may refer to the focal length of the first lens 511 of the first lens group 510, f2 may refer to the focal length of the second lens 512 of the first lens group 510, f3 may refer to the focal length of the third lens 531 of the second lens group 530, f4 may refer to the focal length of the fourth lens 532 of the second lens group 530, f5 may refer to the focal length of the fifth lens 533 of the second lens group 530, f6 may refer to the focal length of the sixth lens 534 of the second lens group 530, g1 may refer to the focal length of the first lens group 510, and g2 may refer to the focal length of the second lens group 530.

Figure 7:
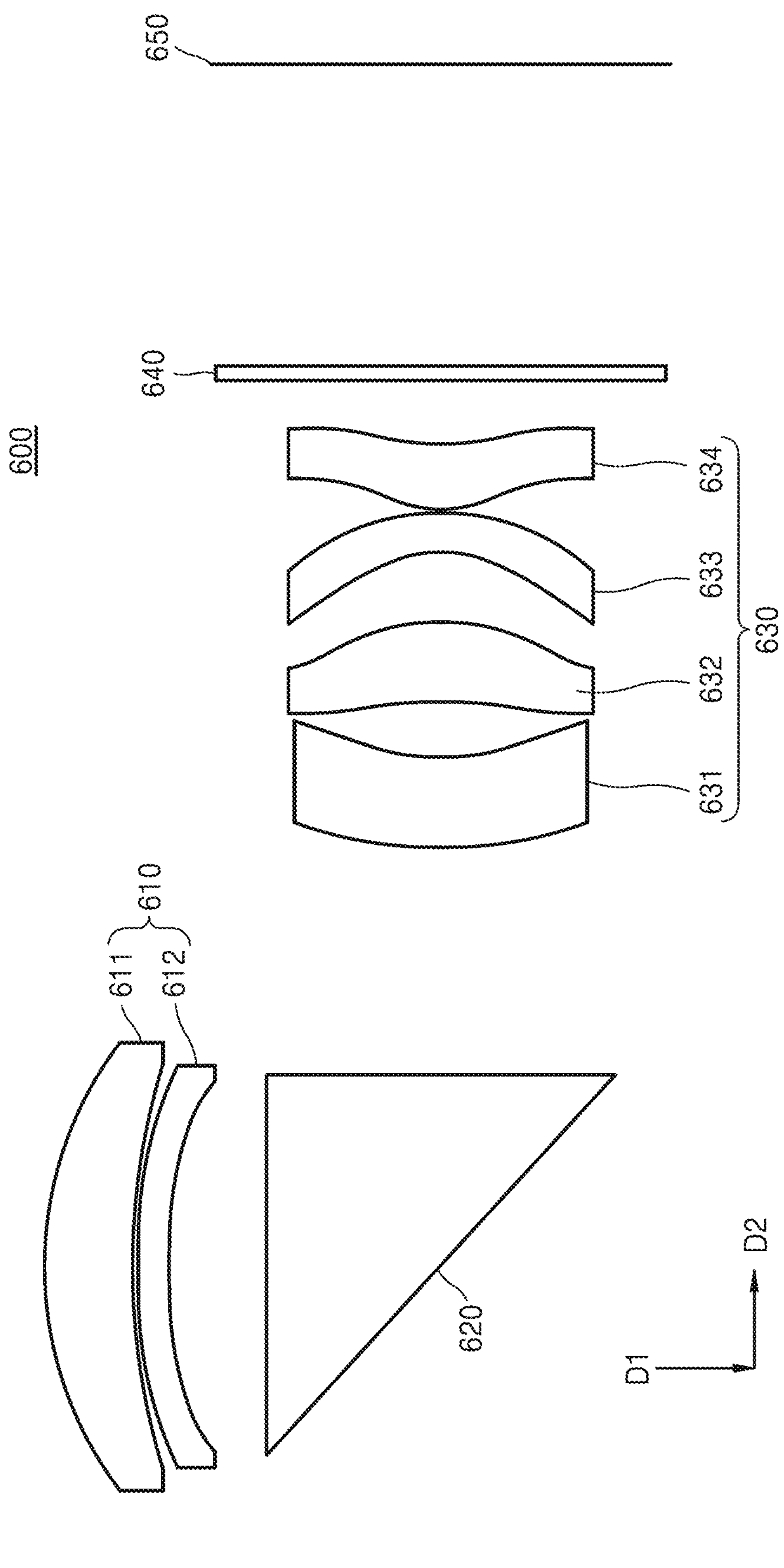
FIG. 7 is a diagram illustrating an examples of an optical system of a camera module according to some implementations.

FIG. 7 is a diagram illustrating an example of an optical system of a camera module 600 according to some implementations. In FIG. 7, the diagonal length of an image surface or active area of an image sensor 650 (hereinafter the size of the image sensor 650) may be about ½ inch (or about 8 mm), and the camera module 600 may have a zoom magnification of about 4× and an Fno of about 2.4, and may have a macro distance of about 150 mm.

The camera module 600 may move in a second direction D2 when a focus adjustment function of a second lens group 630 is performed. Accordingly, the focal point of the optical system of the camera module 600 may vary. In addition, the camera module 600 may perform an image stabilization function by rotating a first lens group 610 and a reflection member 620 in response to disturbance, such as hand tremor or mechanical vibration.

Table 5 shows data on the optical system of the camera module 600 according to some implementations.

TABLE 5

| Surface | Lens | Radius (radius of curvature, mm) | Thickness 1 (mm) | Thickness 2 (mm) | Nd (refractive index) | Vd (Abbe number) | Y Aperture | Focal Length |
|---|---|---|---|---|---|---|---|---|
| S1 | 1P | 5.534739 | 1.486025 | 1.486025 | 1.536786 | 55.7098062 | 3.49356947 | 18.04545 |
| S2 | | 11.70204 | 0.08 | 0.08 | | | 3.19027159 | |
| S3 | 2P | 18.00784 | 0.500001 | 0.500001 | 1.676944 | 19.2379697 | 3.13906175 | −42.3486 |
| S4 | | 10.93628 | 1.633975 | 1.633975 | | | 2.91292913 | |
| S5 | Prism | 1E+18 | 5.9 | 5.9 | 1.608124 | 43.9289954 | 2.83356062 | −1E+35 |
| S6 | | 1E+18 | 3.524248 | 1.015091 | | | 2.55026868 | |
| S7 | 3P | 5.276574 | 1.419814 | 1.419814 | 1.676944 | 19.2379697 | 2.31 | −20.0883 |
| S8 | | 3.388585 | 0.818721 | 0.818721 | | | 2.45440137 | |
| S9 | 4P | −73.9428 | 1.240097 | 1.240097 | 1.536786 | 55.7098062 | 2.48424999 | 8.666991 |
| S10 | | −4.40257 | 1.129515 | 1.129515 | | | 2.59254199 | |
| S11 | 5P | −1.52307 | 0.6 | 0.6 | 1.536786 | 55.7098062 | 2.72640369 | −4.68376 |
| S12 | | −4.39529 | 0.05 | 0.05 | | | 2.95171942 | |
| S13 | 6P | 1.886871 | 0.999983 | 0.999983 | 1.536786 | 55.7098062 | 3.38193847 | 5.111861 |
| S14 | | 4.922491 | 1 | 1 | | | 3.58917138 | |
| S15 | Filter | 1E+18 | 0.210001 | 0.210001 | 1.518274 | 64.1664102 | 3.73333313 | −1E+35 |
| S16 | | 1E+18 | 4.708273 | 7.21743 | | | 3.74976373 | |
| Si | | 1E+18 | −0.00147 | −0.00147 | | | 4.31113442 | |

In Table 5, S1 refers to an object-side surface of a first lens 611 included in the first lens group 610 and S2 refers to an image-side surface of the first lens 611. S3 refers to an object-side surface of a second lens 612 included in the first lens group 610, and S4 refers to an image-side surface of the second lens 612. S5 and S6 respectively refer to an entrance surface and an exit surface of the reflection member 620. S7 refers to an object-side surface of a third lens 631 included in the second lens group 630, and S8 refers to an image-side surface of the third lens 631. S9 refers to an object-side surface of a fourth lens 632 included in the second lens group 630, and S10 refers to an image-side surface of the fourth lens 632. S11 refers to an object-side surface of a fifth lens 633 included in the second lens group 630, and S12 refers to an image-side surface of the fifth lens 633. S13 refers to an object-side surface of a sixth lens 634 included in the second lens group 630, and S14 refers to an image-side surface of the sixth lens 634. Si refers to a surface of the image sensor 650.

In some implementations, aspherical coefficients of lenses may be expressed as shown in Table 6 below. The aspherical coefficients may be calculated based on Equation 3 described above.

TABLE 6

| Surface | K | A | B | C | D | E | F | G | H | J |
|---|---|---|---|---|---|---|---|---|---|---|
| S1 | 0.919824 | −0.00038 | −0.00019 | 6.23E−05 | −1.8E−05 | 3.22E−06 | −3.7E−07 | 2.56E−08 | −1E−09 | 1.65E−11 |
| S2 | −5.96005 | 0.00321 | −0.00216 | 0.001023 | −0.00028 | 4.67E−05 | −4.8E−06 | 2.98E−07 | −1.1E−08 | 1.7E−10 |
| S3 | 15.14124 | 0.00547 | −0.00151 | 0.000697 | −0.00018 | 2.69E−05 | −2.4E−06 | 1.26E−07 | −4E−09 | 6.37E−11 |
| S4 | 3.882368 | 0.004438 | 0.000123 | −4.5E−05 | 2.08E−05 | −4.7E−06 | 3.98E−07 | 1.39E−08 | −4.4E−09 | 1.96E−10 |
| S5 | 0 | 0 | 0 | 0 | 0 | 0 | 0 | 0 | 0 | 0 |
| S6 | 0 | 0 | 0 | 0 | 0 | 0 | 0 | 0 | 0 | 0 |
| S7 | −2.22078 | −0.00283 | −0.00051 | 0.000194 | −6.9E−07 | −2.9E−05 | 1.11E−05 | −1.9E−06 | 1.69E−07 | −6E−09 |
| S8 | −4.0594 | −6.2E−05 | −0.00104 | −0.00044 | 0.000639 | −0.00031 | 7.75E−05 | −1.1E−05 | 9.18E−07 | −3.2E−08 |
| S9 | 98.99084 | −0.02076 | 0.009778 | −0.00741 | 0.004054 | −0.00128 | 0.000242 | −2.7E−05 | 1.73E−06 | −4.8E−08 |
| S10 | −1.83912 | −0.02583 | 0.015766 | −0.00832 | 0.003246 | −0.00079 | 0.000116 | −1E−05 | 4.71E−07 | −8.8E−09 |
| S11 | −2.56129 | 0.040986 | −0.02653 | 0.010319 | −0.00252 | 0.000379 | −3.3E−05 | 1.41E−06 | −4.1E−09 | −1.2E−09 |
| S12 | −0.87624 | 0.003488 | −0.00976 | 0.004976 | −0.00143 | 0.000261 | −3E−05 | 2.2E−06 | −9.1E−08 | 1.58E−09 |
| S13 | −3.86775 | −0.01182 | 0.001625 | −0.00422 | 0.002736 | −0.00098 | 0.00023 | −3.7E−05 | 4.07E−06 | −3E−07 |
| S14 | −15.4652 | 0.031953 | −0.02361 | 0.007937 | −0.00176 | 0.000262 | −2.3E−05 | 6.27E−07 | 1.14E−07 | −1.6E−08 |
| S15 | 0 | 0 | 0 | 0 | 0 | 0 | 0 | 0 | 0 | 0 |
| S16 | 0 | 0 | 0 | 0 | 0 | 0 | 0 | 0 | 0 | 0 |
| S17 | 0 | 0 | 0 | 0 | 0 | 0 | 0 | 0 | 0 | 0 |

In Table 6, K may refer to a conic constant, and A to J may refer to aspherical constants.

In some implementations, the optical system of the camera module 600 may satisfy Tables 7 and 8 below.

TABLE 7

| | |
|---|---|
| EFL | 16.86 |
| Fno | 2.476974 |
| HFOV | 13.46823 |
| NPmax | 1.676944 |
| V1/N1 | 36.25085 |
| V2/N2 | 11.47204 |
| V3/N3 | 27.31691 |
| V4/N4 | 11.47204 |
| V5/N5 | 36.25085 |
| V6/N6 | 36.25085 |
| V7/N7 | 36.25085 |

TABLE 8

| | |
|---|---|
| f/f1 | 0.934308 |
| f/f2 | −0.39812 |
| f/f3 | −0.83929 |
| f/f4 | 1.945312 |
| f/f5 | −3.59967 |
| f/f6 | 3.298212 |
| g1 | 28.4543 |
| g2 | 18.2167 |
| \| g1/f \| | 1.687681 |
| \| g2/f \| | 1.080469 |

In Table 8, f may refer to the focal length of the optical system including the first lens group 610 and the second lens group 630, f1 may refer to the focal length of the first lens 611 of the first lens group 610, f2 may refer to the focal length of the second lens 612 of the first lens group 610, f3 may refer to the focal length of the third lens 631 of the second lens group 630, f4 may refer to the focal length of the fourth lens 632 of the second lens group 630, f5 may refer to the focal length of the fifth lens 633 of the second lens group 630, f6 may refer to the focal length of the sixth lens 634 of the second lens group 630, g1 may refer to the focal length of the first lens group 610, and g2 may refer to the focal length of the second lens group 630.

Figure 8:
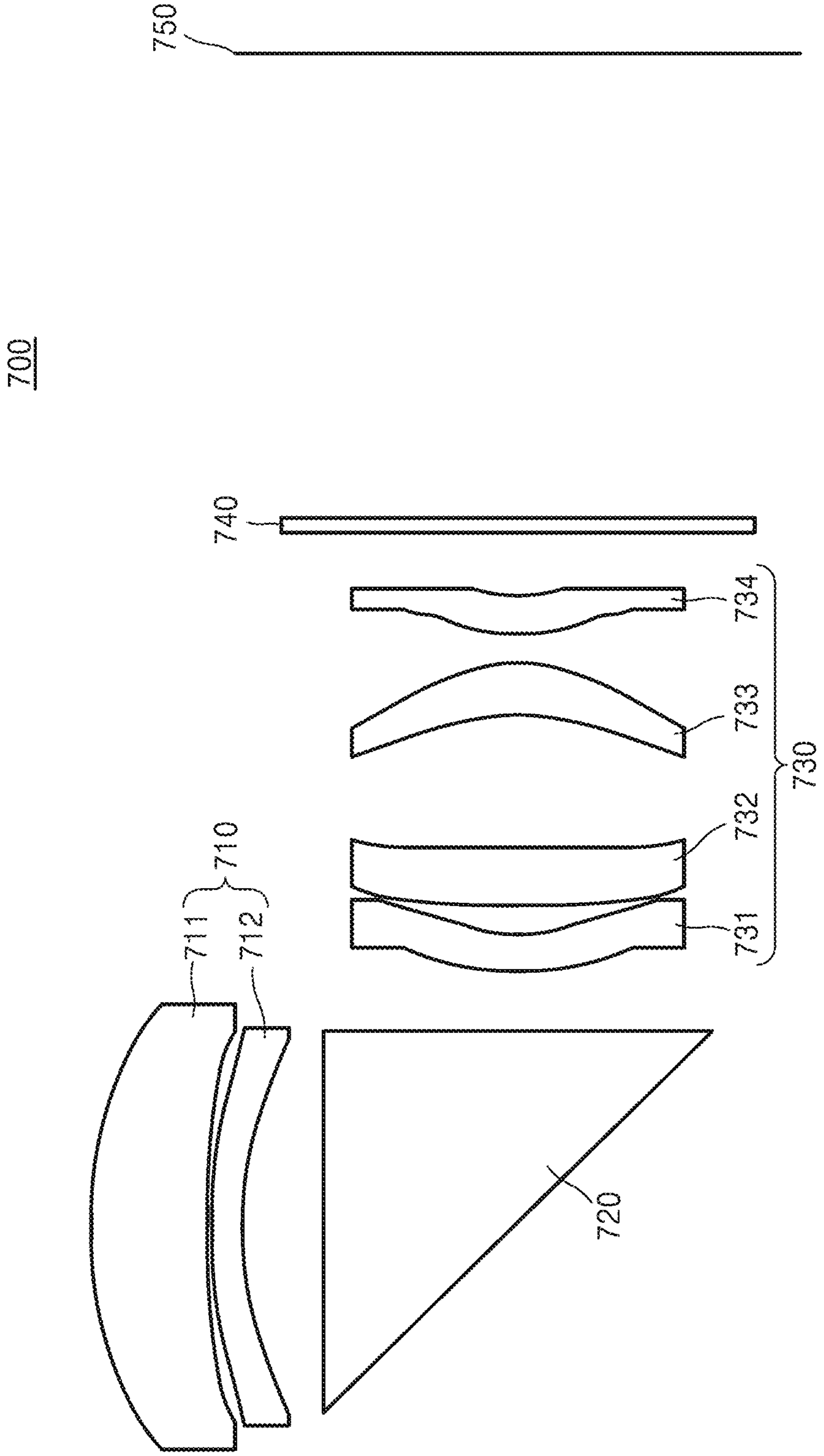
FIG. 8 is a diagram illustrating an example of an optical system of a camera module according to some implementations.

FIG. 8 is a diagram illustrating an example of an optical system of a camera module 700 according to some implementations. In FIG. 8, the diagonal length of an image surface or active area of an image sensor 750 (hereinafter referred to as the size of the image sensor 750) may be ½ inch (or 8 mm), and the camera module 700 may have a zoom magnification of about 5× and a Fno of about 2.4, and may have a macro distance of about 200 mm.

The camera module 700 may move in a second direction D2 when a focus adjustment function of a second lens group 730 is performed. Accordingly, the focal point of the optical system of the camera module 700 may vary. In addition, the camera module 700 may perform an image stabilization function by rotating a first lens group 710 and a reflection member 720 in response to disturbance (for example, hand tremor or mechanical vibration).

Table 9 shows data on the optical system of the camera module 700 according to some implementations.

TABLE 9

| Surface | Lens | Radius (radius of curvature, mm) | Thickness 1 (mm) | Thickness 2 (mm) | Nd (refractive index) | Vd (Abbe number) | Y Aperture | Focal Length |
|---|---|---|---|---|---|---|---|---|
| S1 | 1P | 7.076133 | 1.819966 | 1.819966 | 1.536786 | 55.7098062 | 3.48802897 | 18.72452 |
| S2 | | 21.75955 | 0.05 | 0.05 | | | 3.12619247 | |
| S3 | 2P | 7.658354 | 0.5 | 0.5 | 1.676944 | 19.2379697 | 3.10634186 | −39.5342 |
| S4 | | 5.7975 | 1.230034 | 1.230034 | | | 2.98817349 | |
| S5 | Prism | 1E+18 | 6 | 6 | 1.608124 | 43.9289954 | 2.95501048 | −1E+35 |
| S6 | | 1E+18 | 3.45 | 1 | | | 2.75735195 | |
| S7 | 3P | 3.233527 | 0.571799 | 0.571799 | 1.676944 | 19.2379697 | 2.65011395 | −24.7489 |
| S8 | | 2.516926 | 0.424609 | 0.424609 | | | 2.72579911 | |

TABLE 9-continued

| Surface | Lens | Radius (radius of curvature, mm) | Thickness 1 (mm) | Thickness 2 (mm) | Nd (refractive index) | Vd (Abbe number) | Y Aperture | Focal Length |
|---|---|---|---|---|---|---|---|---|
| S9 | 4P | 9.436736 | 0.936045 | 0.936045 | 1.536786 | 55.7098062 | 2.77981063 | 19.95726 |
| S10 | | 76.47913 | 2.088777 | 2.088777 | | | 2.80359985 | |
| S11 | 5P | −2.98665 | 0.789905 | 0.789905 | 1.536786 | 55.7098062 | 2.81724509 | 12.3984 |
| S12 | | −2.25196 | 0.488864 | 0.488864 | | | 2.85729737 | |
| S13 | 6P | 2.387464 | 0.6 | 0.6 | 1.536786 | 55.7098062 | 3.34001427 | −24.9292 |
| S14 | | 1.848154 | 1 | 1 | | | 3.49747891 | |
| S15 | Filter | 1E+18 | 0.210001 | 0.210001 | 1.518274 | 64.1664102 | 3.62201187 | −1E+35 |
| S16 | | 1E+18 | 4.859999 | 7.31 | | | 3.64101953 | |
| Si | | 1E+18 | −0.02 | −0.02 | | | 4.31231395 | |

In Table 9, S1 refers to an object-side surface of a first lens 711 included in the first lens group 710 and S2 refers to an image-side surface of the first lens 711. S3 refers to an object-side surface of a second lens 712 included in the first lens group 710, and S4 refers to an image-side surface of the second lens 712. S5 and S6 respectively refer to an entrance surface and an exit surface of the reflection member 720. S7 refers to an object-side surface of a third lens 731 included in the second lens group 730, and S8 refers to an image-side surface of the third lens 731. S9 refers to an object-side surface of a fourth lens 732 included in the second lens group 730, and S10 refers to an image-side surface of the fourth lens 732. S11 refers to an object-side surface of a fifth lens 733 included in the second lens group 730, and S12 refers to an image-side surface of the fifth lens 733. S13 refers to an object-side surface of a sixth lens 734 included in the second lens group 730, and S14 refers to an image-side surface of the sixth lens 734. Si refers to a surface of the image sensor 750.

In some implementations, aspherical coefficients of lenses may be expressed as shown in Table 10 below. The aspherical coefficients may be calculated based on Equation 3 described above.

TABLE 10

| Surface | K | A | B | C | D | E | F | G | H | J |
|---|---|---|---|---|---|---|---|---|---|---|
| S1 | 1.581661 | 8.48E−05 | −8.4E−06 | −4.2E−06 | 4.53E−06 | −1.3E−06 | 1.77E−07 | −1.4E−08 | 5.51E−10 | −8.9E−12 |
| S2 | 9.964751 | 0.001433 | −0.00078 | 0.000636 | −0.00024 | 4.96E−05 | −6.1E−06 | 4.53E−07 | −1.9E−08 | 3.29E−10 |
| S3 | −11.8735 | 0.001859 | −0.00091 | 0.000691 | −0.00027 | 5.98E−05 | −7.7E−06 | 5.87E−07 | −2.5E−08 | 4.42E−10 |
| S4 | −6.1176 | 0.001586 | −8.5E−05 | 0.000104 | −6.2E−05 | 1.67E−05 | −2.5E−06 | 2.14E−07 | −1E−08 | 2.07E−10 |
| S5 | 0 | 0 | 0 | 0 | 0 | 0 | 0 | 0 | 0 | 0 |
| S6 | 0 | 0 | 0 | 0 | 0 | 0 | 0 | 0 | 0 | 0 |
| S7 | −4.13305 | 0.001918 | −0.00503 | 0.002342 | −0.00078 | 0.000139 | −1.3E−05 | 5.82E−07 | −3.9E−09 | −4.1E−10 |
| S8 | 4.71472 | 0.017067 | −0.01828 | 0.009121 | −0.00319 | 0.000735 | −0.00011 | 1.01E−05 | −5.3E−07 | 1.22E−08 |
| S9 | 8.754561 | −7.2E−05 | −0.01016 | 0.004639 | −0.00083 | 4.02E−05 | 1.03E−05 | −2.1E−06 | 1.68E−07 | −5.2E−09 |
| S10 | 99 | 0.002757 | −0.00695 | 0.00376 | −0.00113 | 0.00027 | −5E−05 | 5.76E−06 | −3.6E−07 | 9.5E−09 |
| S11 | −2.76053 | 0.041093 | −0.02463 | 0.007828 | −0.00154 | 0.000202 | −1.7E−05 | 7.23E−07 | 5.6E−10 | −8.1E−10 |
| S12 | −3.04983 | 0.029927 | −0.02407 | 0.008895 | −0.00211 | 0.000355 | −4.1E−05 | 3.07E−06 | −1.4E−07 | 2.79E−09 |
| S13 | −3.49558 | −0.00186 | −0.01226 | 0.00281 | 0.000832 | −0.00066 | 0.000195 | −3.5E−05 | 4.07E−06 | −3.2E−07 |
| S14 | −6.03808 | 0.022074 | −0.02992 | 0.014191 | −0.00431 | 0.000919 | −0.00014 | 1.62E−05 | −1.3E−06 | 7.74E−08 |
| S15 | 0 | 0 | 0 | 0 | 0 | 0 | 0 | 0 | 0 | 0 |
| S16 | 0 | 0 | 0 | 0 | 0 | 0 | 0 | 0 | 0 | 0 |
| S17 | 0 | 0 | 0 | 0 | 0 | 0 | 0 | 0 | 0 | 0 |

In Table 10, K may refer to a conic constant, and A to J may refer to aspherical constants.

In some implementations, the optical system of the camera module 700 may satisfy Tables 11 and 12 below.

TABLE 11

| | |
|---|---|
| EFL | 16.86 |
| Fno | 2.428631 |

TABLE 11-continued

| | |
|---|---|
| HFOV | 13.37638 |
| NPmax | 1.676944 |
| V1/N1 | 36.25085 |
| V2/N2 | 11.47204 |
| V3/N3 | 27.31691 |
| V4/N4 | 11.47204 |
| V5/N5 | 36.25085 |
| V6/N6 | 36.25085 |
| V7/N7 | 36.25085 |

TABLE 12

| | |
|---|---|
| f/f1 | 0.900423 |
| f/f2 | −0.42647 |
| f/f3 | −0.68124 |
| f/f4 | 0.844805 |
| f/f5 | 1.359853 |
| f/f6 | −0.67632 |
| g1 | 30.9496 |
| g2 | 19.6726 |

TABLE 12-continued

| | |
|---|---|
| \| g1/f \| | 1.835682 |
| \| g2/f \| | 1.166821 |

In Table 12, f may refer to the focal length of the optical system including the first lens group 710 and the second lens group 730, f1 may refer to the focal length of the first lens 711 of the first lens group 710, f2 may refer to the focal length of the second lens 712 of the first lens group 710, f3 may refer to the focal length of the third lens 731 of the second lens group 730, f4 may refer to the focal length of the fourth lens 732 of the second lens group 730, f5 may refer to the focal length of the fifth lens 733 of the second lens group 730, f6 may refer to the focal length of the sixth lens 734 of the second lens group 730, g1 may refer to the focal length of the first lens group 710, and g2 may refer to the focal length of the second lens group 730.

Figure 9:
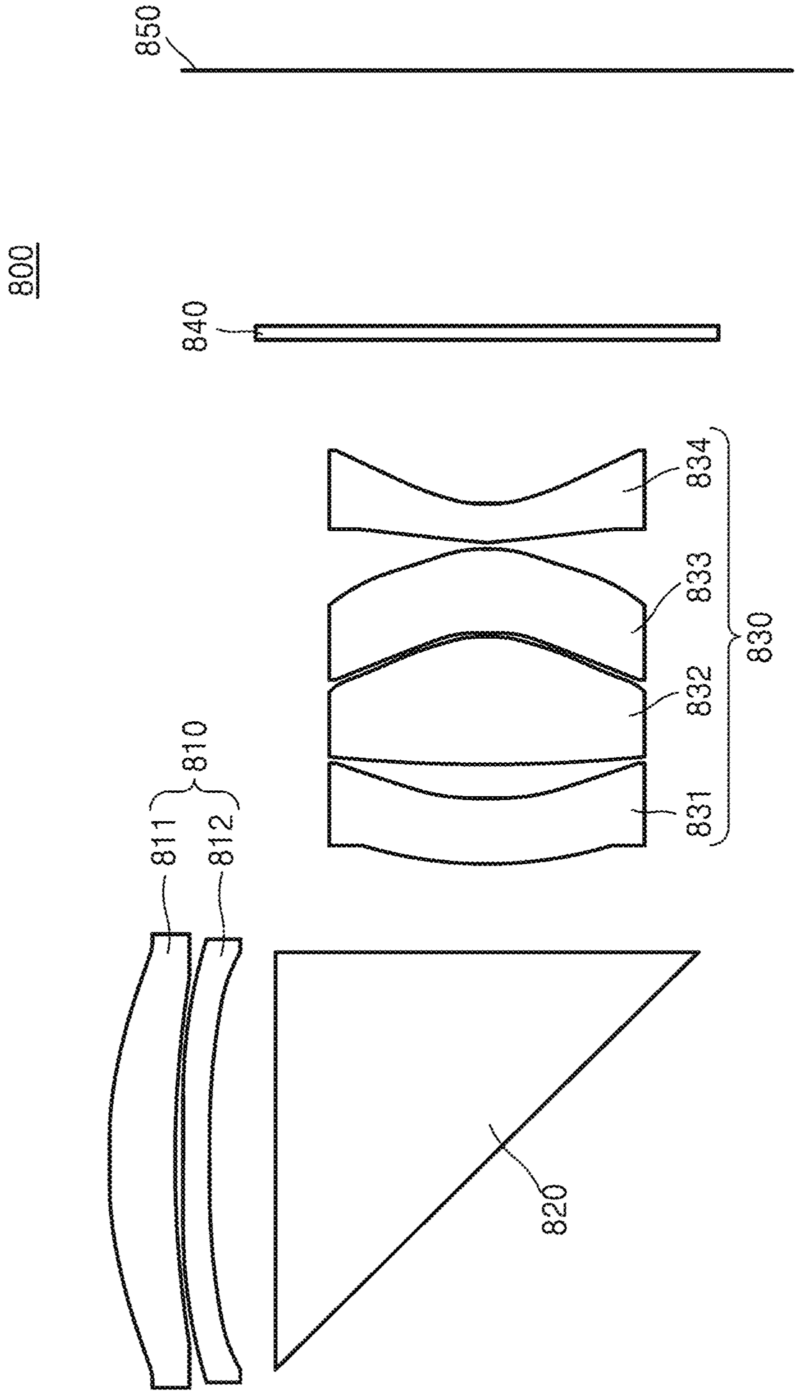
FIG. 9 is a diagram illustrating an example of an optical system of a camera module according to some implementations.

FIG. 9 is a diagram illustrating an example of an optical system of a camera module 800 according to some implementations. In FIG. 9, the diagonal length of an image surface or active area of an image sensor 850 (hereinafter referred to as the size of the image sensor 850) may be 1/1.57 inch (or 10 mm), and the camera module 800 may have a zoom magnification of about 2.9× and an Fno of about 1.9, and may have a macro distance of about 500 mm.

The camera module 800 may move in a second direction D2 when a focus adjustment function of a second lens group 830 is performed. Accordingly, the focal point of the optical system of the camera module 800 may vary. Additionally, the camera module 800 may perform an image stabilization function by rotating a first lens group 810 and a reflection member 820 in response to disturbance, such as hand tremor or mechanical vibration.

Table 13 shows data on the optical system of the camera module 800 according to some implementations.

TABLE 13

| Surface | Lens | Radius (radius of curvature, mm) | Thickness 1 (mm) | Thickness 2 (mm) | Nd (refractive index) | Vd (Abbe number) | Y Aperture | Focal Length |
|---|---|---|---|---|---|---|---|---|
| S1 | 1P | 9.45147 | 1.193069 | 1.193069 | 1.536786 | 55.7098062 | 4.07166734 | 28.51014 |
| S2 | | 23.62565 | 0.1 | 0.1 | | | 4.02642128 | |
| S3 | 2P | 37.26943 | 0.5 | 0.5 | 1.676944 | 19.2379697 | 3.97063564 | −101.095 |
| S4 | | 23.99829 | 1.146966 | 1.146966 | | | 3.82144454 | |
| S5 | Prism | 1E+18 | 7.5 | 7.5 | 1.608124 | 43.9289954 | 3.77773256 | −1E+35 |
| S6 | | 1E+18 | 1.614159 | 1 | | | 3.40726719 | |
| S7 | 3P | 5.374537 | 1.177141 | 1.177141 | 1.676944 | 19.2379697 | 3.29020464 | −22.5836 |
| S8 | | 3.624971 | 0.624878 | 0.624878 | | | 3.42524629 | |
| S9 | 4P | 14.35243 | 2.297288 | 2.297288 | 1.536786 | 55.7098062 | 3.44871932 | 4.154402 |
| S10 | | −2.49265 | 0.1 | 0.1 | | | 3.47386304 | |
| S11 | 5P | −2.43905 | 1.505219 | 1.505219 | 1.569897 | 37.4028193 | 3.4754419 | 29.08001 |
| S12 | | −2.60246 | 0.117901 | 0.117901 | | | 3.61492325 | |
| S13 | 6P | 4.397226 | 0.677572 | 0.677572 | 1.536786 | 55.7098062 | 3.50871277 | −5.69049 |
| S14 | | 1.705458 | 3 | 3 | | | 3.60171995 | |
| S15 | Filter | 1E+18 | 0.21 | 0.21 | 1.518274 | 64.1664102 | 4.07352171 | −1E+35 |
| S16 | | 1E+18 | 4.695841 | 5.31 | | | 4.10951023 | |
| Si | | 1E+18 | −0.02 | −0.02 | | | 5.3501388 | |

In Table 13, S1 refers to an object-side surface of a first lens 811 included in the first lens group 810, and S2 refers to an image-side surface of the first lens 811. S3 refers to an object-side surface of a second lens 812 included in the first lens group 810, and S4 refers to an image-side surface of the second lens 812. S5 and S6 respectively refer to an entrance surface and an exit surface of the reflection member 820. S7 refers to an object-side surface of a third lens 831 included in the second lens group 830, and S8 refers to an image-side surface of the third lens 831. S9 refers to an object-side surface of a fourth lens 832 included in the second lens group 830, and S10 refers to an image-side surface of the fourth lens 832. S11 refers to an object-side surface of a fifth lens 833 included in the second lens group 830, and S12 refers to an image-side surface of the fifth lens 833. S13 refers to an object-side surface of a sixth lens 834 included in the second lens group 830, and S14 refers to an image-side surface of the sixth lens 834. Si refers to a surface of the image sensor 850.

In some implementations, aspherical coefficients of lenses may be expressed as shown in Table 14 below. The aspherical coefficients may be calculated based on Equation 3 described above.

TABLE 14

| Surface | K | A | B | C | D | E | F | G | H | J |
|---|---|---|---|---|---|---|---|---|---|---|
| S1 | 1.131567 | −0.00012 | 4.92E−05 | −1.4E−05 | 8.67E−07 | 5.58E−08 | −1.5E−08 | 1.16E−09 | −4E−11 | 5.38E−13 |
| S2 | 0 | −0.00142 | 0.000822 | −0.00021 | 3.4E−05 | −3.7E−06 | 2.75E−07 | −1.3E−08 | 3.28E−10 | −3.6E−12 |
| S3 | −90.7711 | −0.00106 | 0.000706 | −0.00015 | 2.17E−05 | −2.3E−06 | 1.64E−07 | −7.4E−09 | 1.85E−10 | −1.9E−12 |
| S4 | 32.36529 | −0.00039 | 0.00013 | −1.1E−06 | −1.3E−06 | 1.95E−07 | −1.2E−08 | 1.13E−10 | 1.73E−11 | −5.8E−13 |

TABLE 14-continued

| Surface | K | A | B | C | D | E | F | G | H | J |
|---|---|---|---|---|---|---|---|---|---|---|
| S5 | 0 | 0 | 0 | 0 | 0 | 0 | 0 | 0 | 0 | 0 |
| S6 | 0 | 0 | 0 | 0 | 0 | 0 | 0 | 0 | 0 | 0 |
| S7 | −3.16795 | −0.00316 | 0.000153 | −9.3E−05 | 2.73E−05 | −5.5E−06 | 7.13E−07 | −5.7E−08 | 2.52E−09 | −4.7E−11 |
| S8 | −4.42329 | 0.000615 | −0.00053 | 3.06E−05 | 5.14E−06 | −1.9E−06 | 2.8E−07 | −2.3E−08 | 1.01E−09 | −1.9E−11 |
| S9 | 8.214352 | −0.00415 | 0.000242 | −4.2E−06 | 2.33E−07 | −8.6E−09 | 2.07E−10 | −3.1E−12 | 2.65E−14 | −9.8E−17 |
| S10 | −1.93796 | 0.004287 | 0.002218 | −0.00078 | 0.000146 | −1.7E−05 | 1.25E−06 | −4.8E−08 | 6E−10 | 7.49E−12 |
| S11 | −2.15041 | 0.004367 | 0.002559 | −0.0009 | 0.000174 | −2.2E−05 | 1.84E−06 | −9.5E−08 | 2.75E−09 | −3.4E−11 |
| S12 | −4.71767 | −0.00059 | −0.00096 | 0.000372 | −8.3E−05 | 1.17E−05 | −1.1E−06 | 6.14E−08 | −2E−09 | 2.85E−11 |
| S13 | −1.84898 | −0.03795 | 0.017071 | −0.00695 | 0.002245 | −0.00055 | 9.75E−05 | −1.3E−05 | 1.17E−06 | −7.6E−08 |
| S14 | −4.42494 | −0.00899 | 0.004151 | −0.00165 | 0.000513 | −0.00012 | 2.09E−05 | −2.6E−06 | 2.3E−07 | −1.4E−08 |
| S15 | 0 | 0 | 0 | 0 | 0 | 0 | 0 | 0 | 0 | 0 |
| S16 | 0 | 0 | 0 | 0 | 0 | 0 | 0 | 0 | 0 | 0 |
| S17 | 0 | 0 | 0 | 0 | 0 | 0 | 0 | 0 | 0 | 0 |

In Table 14 above, K may refer to a conic constant, and A to J may refer to aspherical constants.

In some implementations, the optical system of the camera module 800 may satisfy Tables 15 and 16 below.

TABLE 15

| | |
|---|---|
| EFL | 16 |
| Fno | 1.965603 |
| HFOV | 17.30142 |
| NPmax | 1.676944 |
| V1/N1 | 36.25085 |
| V2/N2 | 11.47204 |
| V3/N3 | 27.31691 |
| V4/N4 | 11.47204 |
| V5/N5 | 36.25085 |
| V6/N6 | 23.82501 |
| V7/N7 | 36.25085 |

TABLE 16

| | |
|---|---|
| f/f1 | 0.561204 |
| f/f2 | −0.15827 |
| f/f3 | −0.70848 |
| f/f4 | 3.851337 |
| f/f5 | 0.550206 |
| f/f6 | −2.81171 |
| g1 | 38.5366 |
| g2 | 20.371 |
| \| g1/f \| | 2.408538 |
| \| g2/f \| | 1.273188 |

In Table 16, f may refer to the focal length of the optical system including the first lens group 810 and the second lens group 830, f1 may refer to the focal length of the first lens 811 of the first lens group 810, f2 may refer to the focal length of the second lens 812 of the first lens group 810, f3 may refer to the focal length of the third lens 831 of the second lens group 830, f4 may refer to the focal length of the fourth lens 832 of the second lens group 830, f5 may refer to the focal length of the fifth lens 833 of the second lens group 830, f6 may refer to the focal length of the sixth lens 834 of the second lens group 830, g1 may refer to the focal length of the first lens group 810, and g2 may refer to the focal length of the second lens group 830.

Figure 10:
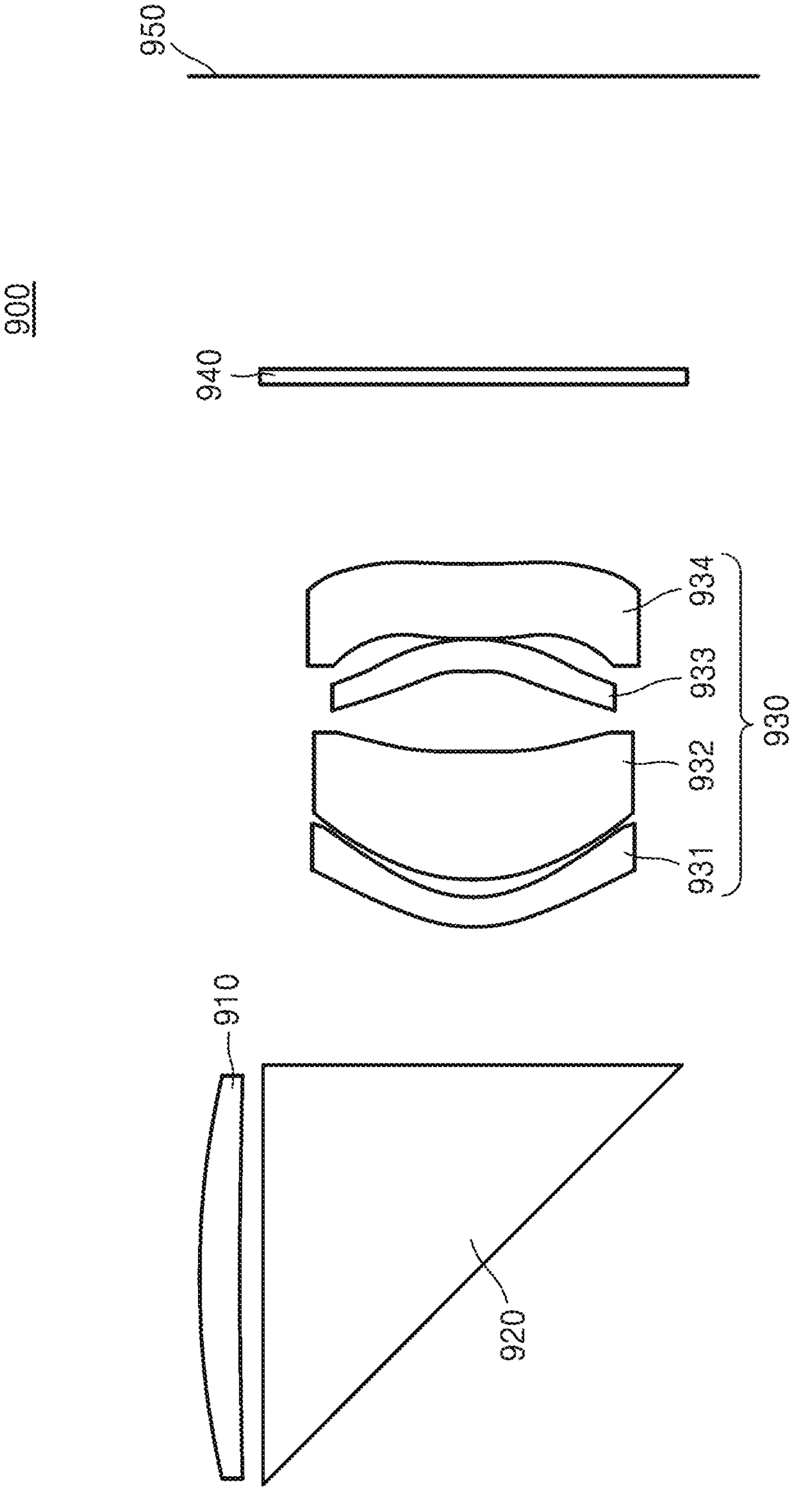
FIG. 10 is a diagram illustrating an example of an optical system of a camera module according to some implementations.

FIG. 10 is a diagram illustrating an example of an optical system of a camera module 900 according to some implementations. In FIG. 10, the diagonal length of an image surface or active area of an image sensor 950 (hereinafter referred to as the size of the image sensor 950) may be ½ inch (or 8 mm), and the camera module 900 may have an Fno of about 2.4, and may have a macro distance of about 300 mm.

The camera module 900 may move in a second direction D2 when a focus adjustment function of a second lens group 930 is performed. Accordingly, the focal point of the optical system of the camera module 900 may vary. Additionally, the camera module 900 may perform an image stabilization function by rotating a first lens group 910 and a reflection member 920 in response to disturbance, such as hand tremor or mechanical vibration.

Table 17 shows data on the optical system of the camera module 900 according to some implementations.

TABLE 17

| Surface | Lens | Radius (radius of curvature, mm) | Thickness 1 (mm) | Thickness 2 (mm) | Nd (refractive index) | Vd (Abbe number) | Y Aperture | Focal Length |
|---|---|---|---|---|---|---|---|---|
| S1 | 1P | 13.98434 | 0.629463 | 0.629463 | 1.545785 | 55.9900686 | 3.16999995 | 37.79794 |
| S2 | | 42.7234 | 0.360945 | 0.360945 | | | 3.15080066 | |
| S3 | Prism | 1E+18 | 6.6 | 6.6 | 1.68888 | 26.8129522 | 3.12461173 | 1E+35 |
| S4 | | 1E+18 | 2.225849 | 1.3 | | | 2.78430576 | |
| S5 | 2P | −2.57913 | 0.46558 | 0.46558 | 1.676944 | 19.2379697 | 2.5202763 | −15.6374 |
| S6 | | −1.92272 | 0.285428 | 0.285428 | | | 2.45502746 | |
| S7 | 3P | −3.0843 | 1.969049 | 1.969049 | 1.536786 | 55.7098062 | 2.49854109 | 8.400839 |
| S8 | | −7.58305 | 1.282889 | 1.282889 | | | 2.29148991 | |
| S9 | 4P | 1.84679 | 0.46789 | 0.46789 | 1.676944 | 19.2379697 | 2.22281427 | −9.85222 |
| S10 | | 2.815212 | 0.05 | 0.05 | | | 2.22639995 | |
| S11 | 5P | −4.1136 | 1.167609 | 1.167609 | 1.655726 | 21.5362498 | 2.18391575 | 9.617247 |
| S12 | | −10.5011 | 2.85 | 2.85 | | | 2.60094228 | |
| S13 | Filter | 1E+18 | 0.21 | 0.21 | 1.518274 | 64.1664102 | 3.29390206 | −1E+35 |
| S14 | | 1E+18 | 4.618514 | 5.544363 | | | 3.32360963 | |
| Si | | 1E+18 | 0.007192 | 0.007192 | | | 4.35091955 | |

In Table 17, S1 refers to an object-side surface of a first lens included in the first lens group 910, and S2 refers to an image-side surface of the first lens. S3 and S4 respectively refer to an entrance surface and an exit surface of the reflection member 920. S5 refers to an object-side surface of a second lens 931 included in the second lens group 930, and S6 refers to an image-side surface of the second lens 931. S7 refers to an object-side surface of a third lens 932 included in the second lens group 930, and S8 refers to an image-side surface of the third lens 932. S9 refers to an object-side surface of a fourth lens 933 included in the second lens group 930, and S10 refers to an image-side surface of the fourth lens 933. S11 refers to an object-side surface of a fifth lens 934 included in the second lens group 930, and S12 refers to an image-side surface of the fifth lens 934. Si refers to a surface of the image sensor 950.

In some implementations, aspherical coefficients of lenses may be expressed as shown in Table 18 below. The aspherical coefficients may be calculated based on Equation 3 described above.

In Table 20, f may refer to the focal length of the optical system including the first lens group 910 and the second lens group 930, f1 may refer to the focal length of the first lens of the first lens group 910, f2 may refer to the focal length of the second lens 931 of the second lens group 930, f3 may refer to the focal length of the third lens 932 of the second lens group 930, f4 may refer to the focal length of the fourth lens 933 of the second lens group 930, f5 may refer to the focal length of the fifth lens 934 of the second lens group 930, g1 may refer to the focal length of the first lens group 910, and g2 may refer to the focal length of the second lens group 930.

Figure 11:
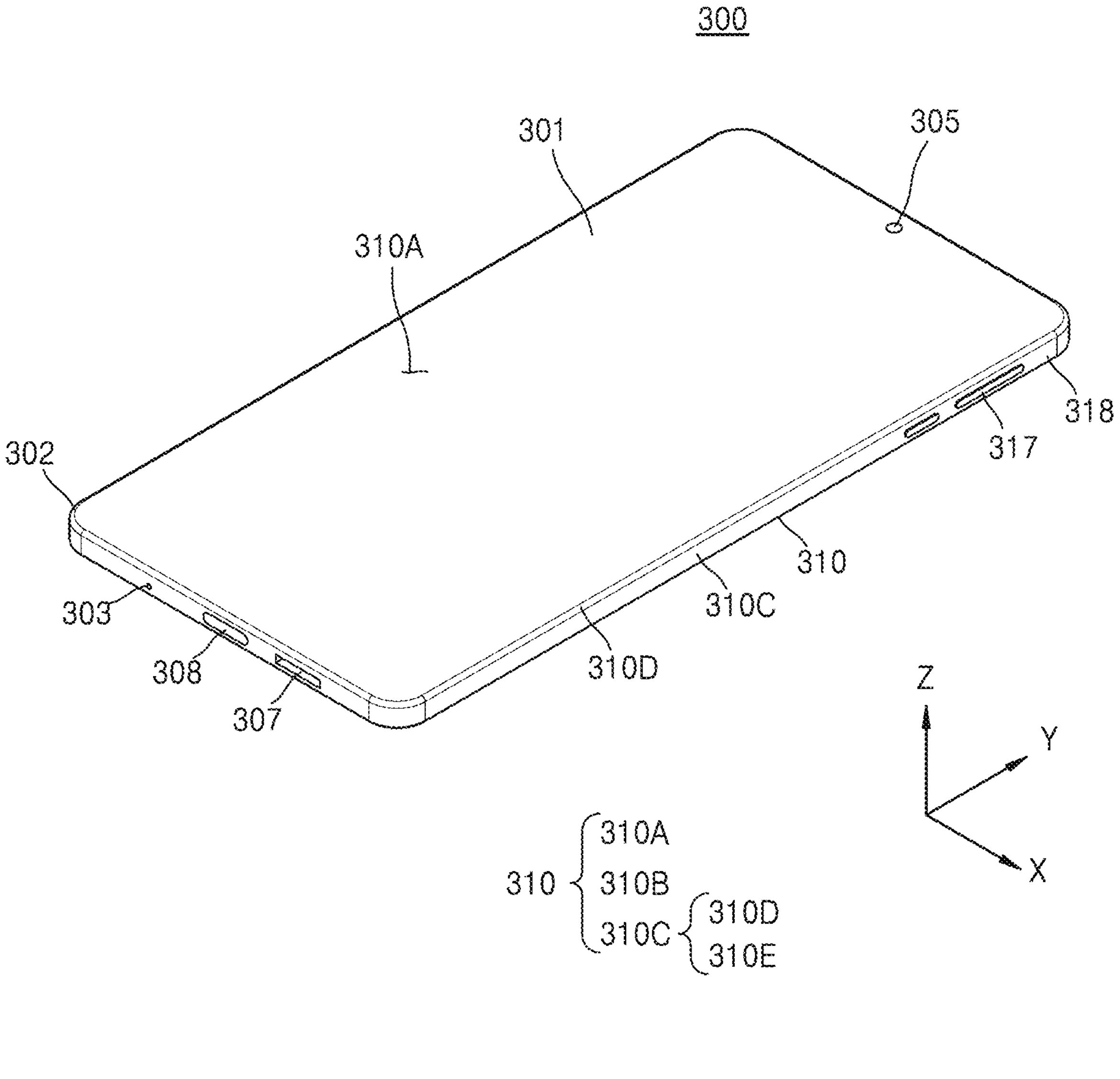
FIG. 11 is a front perspective diagram illustrating an example of an electronic device according to some implementations.
Figure 12:
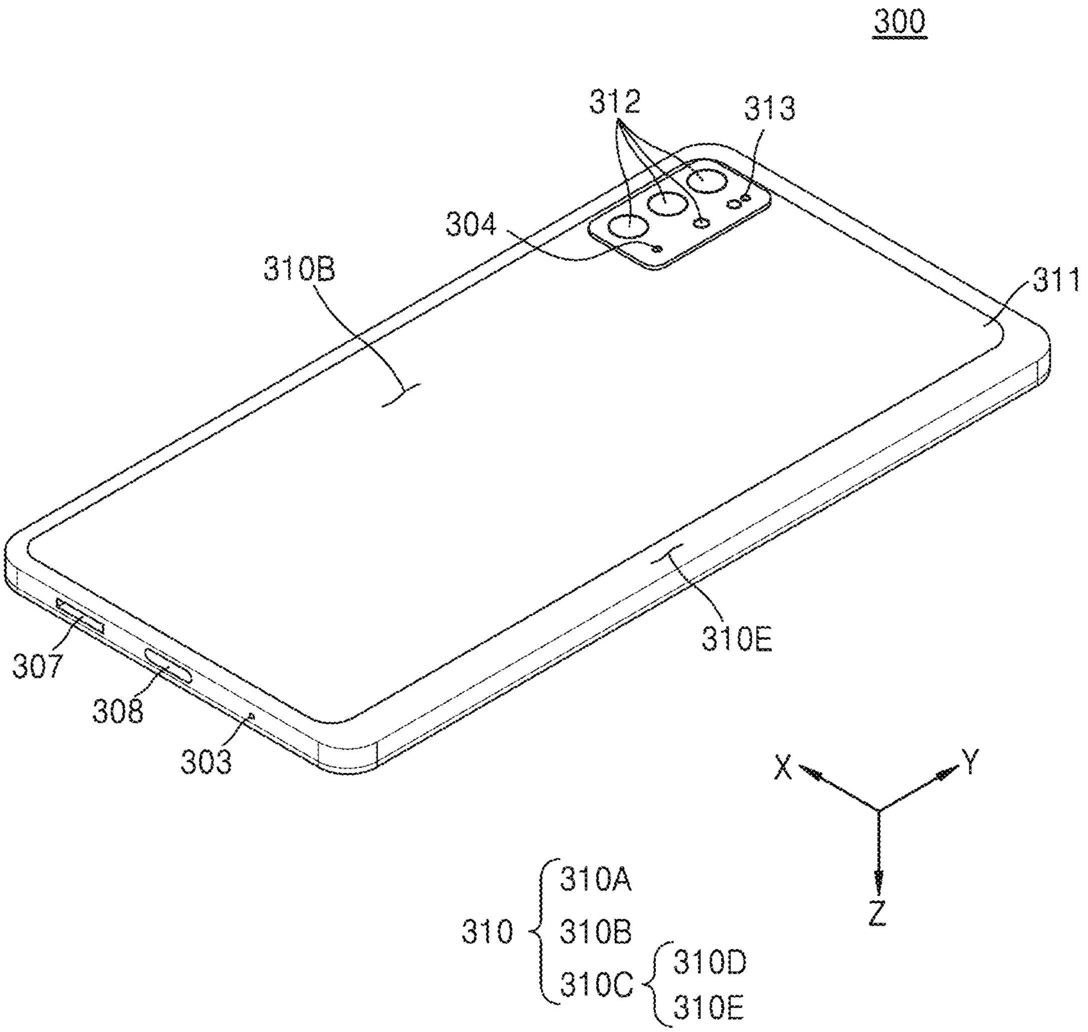
FIG. 12 is a rear perspective diagram illustrating an example of an electronic device according to some implementations.

FIG. 11 is a front perspective diagram illustrating an example of an electronic device 300 according to some implementations, and FIG. 12 is a rear perspective diagram illustrating the electronic device 300 according to some implementations. In FIGS. 11 and 12, the electronic device 300, such as the electronic device 1 (in FIG. 1) may include a housing 310. The housing 310 may include a first surface (or front surface) 310A, a second surface (or rear surface) 310B, and a third surface 310C surrounding a space between the first surface 310A and the second surface 310B. In some implementations, the housing 310 may be a structure forming some of the first surface 310A, the second surface 310B, and the third surface 310C.

TABLE 18

| Surface | K | A | B | C | D | E | F | G | H | J |
|---|---|---|---|---|---|---|---|---|---|---|
| S1 | 1.581661 | 8.48E−05 | −8.4E−06 | −4.2E−06 | 4.53E−06 | −1.3E−06 | 1.77E−07 | −1.4E−08 | 5.51E−10 | −8.9E−12 |
| S2 | 9.964751 | 0.001433 | −0.00078 | 0.000636 | −0.00024 | 4.96E−05 | −6.1E−06 | 4.53E−07 | −1.9E−08 | 3.29E−10 |
| S3 | −11.8735 | 0.001859 | −0.00091 | 0.000691 | −0.00027 | 5.98E−05 | −7.7E−06 | 5.87E−07 | −2.5E−08 | 4.42E−10 |
| S4 | −6.1176 | 0.001586 | −8.5E−05 | 0.000104 | −6.2E−05 | 1.67E−05 | −2.5E−06 | 2.14E−07 | −1E−08 | 2.07E−10 |
| S5 | 0 | 0 | 0 | 0 | 0 | 0 | 0 | 0 | 0 | 0 |
| S6 | 0 | 0 | 0 | 0 | 0 | 0 | 0 | 0 | 0 | 0 |
| S7 | −4.13305 | 0.001918 | −0.00503 | 0.002342 | −0.00078 | 0.000139 | −1.3E−05 | 5.82E−07 | −3.9E−09 | −4.1E−10 |
| S8 | −4.71472 | 0.017067 | −0.01828 | 0.009121 | −0.00319 | 0.000735 | −0.00011 | 1.01E−05 | −5.3E−07 | 1.22E−08 |
| S9 | 8.754561 | −7.2E−05 | −0.01016 | 0.004639 | −0.00083 | 4.02E−05 | 1.03E−05 | −2.1E−06 | 1.68E−07 | −5.2E−09 |
| S10 | 99 | 0.002757 | −0.00695 | 0.00376 | −0.00113 | 0.00027 | −5E−05 | 5.76E−06 | −3.6E−07 | 9.5E−09 |
| S11 | −2.76053 | 0.041093 | −0.02463 | 0.007828 | −0.00154 | 0.000202 | −1.7E−05 | 7.23E−07 | 5.6E−10 | −8.1E−10 |
| S12 | −3.04983 | 0.029927 | −0.02407 | 0.008895 | −0.00211 | 0.000355 | −4.1E−05 | 3.07E−06 | −1.4E−07 | 2.79E−09 |
| S13 | −3.49558 | −0.00186 | −0.01226 | 0.00281 | 0.000832 | −0.00066 | 0.000195 | −3.5E−05 | 4.07E−06 | −3.2E−07 |
| S14 | −6.03808 | 0.022074 | −0.02992 | 0.014191 | −0.00431 | 0.000919 | −0.00014 | 1.62E−05 | −1.3E−06 | 7.74E−08 |
| S15 | 0 | 0 | 0 | 0 | 0 | 0 | 0 | 0 | 0 | 0 |
| S16 | 0 | 0 | 0 | 0 | 0 | 0 | 0 | 0 | 0 | 0 |
| S17 | 0 | 0 | 0 | 0 | 0 | 0 | 0 | 0 | 0 | 0 |

In Table 18, K may refer to a conic constant, and A to J may refer to aspherical constants.

In some implementations, the optical system of the camera module 900 may satisfy Tables 19 and 20 below.

TABLE 19

| | |
|---|---|
| EFL | 15.25 |
| Fno | 2.4 |
| HFOV | 9.05 |
| NPmax | 1.69 |
| V1/N1 | 36.22112 |
| V2/N2 | 15.87617 |
| V4/N4 | 11.47204 |
| V5/N5 | 36.25085 |
| V6/N6 | 11.47204 |
| V7/N7 | 13.00714 |

TABLE 20

| | |
|---|---|
| f/f1 | 0.403461 |
| f/f2 | −0.97523 |
| f/f3 | 1.815295 |
| f/f4 | −1.54787 |
| f/f5 | 1.585693 |
| g1 | 37.7979 |
| g2 | −21.1824 |
| \| g1/f \| | 2.478551 |
| \| g2/f \| | −1.38901 |

At least a portion of the first surface 310A may be formed by a front plate 302, such as a glass plate including various coating layers, or a polymer plate, that is substantially transparent. In some implementations, the second surface 310B may be formed by a rear plate 311 that is substantially opaque. For example, the rear plate 311 may include coated or colored glass, a ceramic material, a polymer, a metal, such as aluminum, stainless steel (STS), or magnesium, or a combination of at least two of the materials. The third surface 310C may be coupled to the front plate 302 and the rear plate 311 and may be formed by a side bezel structure (or side member) 318 including a metal and/or a polymer.

In some implementations, the rear plate 311 and the side bezel structure 318 may be formed in one piece and may include the same material (for example, a metallic material such as aluminum). In some implementations, the rear plate 311 may include two second regions 310E that curve and seamlessly extend from portions of the second surface 310B toward the front plate 302. The second regions 310E may be included in both long edge end portions of the rear plate 311.

In some implementations, the front plate 302 (or the rear plate 311) may include only one of first regions 310D (or the second regions 310E). In some implementations, the front plate 302 (or the rear plate 311) may not include portions of the first regions 310D (or portions of the second regions 310E).

When viewed from a side of the electronic device 300, the side bezel structure 318 may have a first thickness (or width) in a lateral direction, such as short sides, in which the first regions 310D or the second regions 310E are not included, as described above, and a second thickness in a lateral direction, such as long sides, in which the first regions 310D or the second regions 310E are included, wherein the second thickness may be less than the first thickness.

In some implementations, a display 301 may be visually exposed through a a portion of the front plate 302. For example, at least a portion of the display 301 may be visually exposed through the front plate 302 including the first surface 310A and the first regions 310D of the third surface 310C. The display 301 may be disposed on a rear surface of the front plate 302.

In FIGS. 11 and 12, audio modules may include microphone holes 303 and 304 and speaker holes 307. Camera modules may include a first camera module 305, such as a punch hole camera, exposed on the first surface 310A of the electronic device 300, a second camera module 312 exposed on the second surface 310B of the electronic device 300, and/or a flash 313. In some implementations, the first camera module 305 may be visually exposed through a portion of a screen region such as the first surface 310A and the first regions 310D of the display 301. For example, the first camera module 305 may be visually exposed on a portion of the screen region such as the first surface 310A and the first regions 310D through an opening formed in a portion of the display 301. In some implementations, the first camera module 305, such as an under-display camera, may be disposed on a rear surface of the display 301 and may not be visually exposed on the screen region such as the first surface 310A and the first regions 310D.

The second camera module 312 may include a plurality of cameras, such as a dual camera, a triple camera, or a quad camera. However, the second camera module 312 is not limited to including a plurality of cameras and may include one camera.

The first camera module 305 and the second camera module 312 may include one or more lenses, an image sensor, and/or an ISP. In some implementations, two or more lenses, such as an infrared lens, a wide-angle lens, and a telephoto lens, and image sensors may be arranged on a side of the electronic device 300. In some implementations, the first camera module 305 and the second camera module 312 may have different fields of view. For example, the first camera module 305 may have the narrowest field of view, and the second camera module 312 may have a relatively wide field of view. When the camera modules are designed to have different fields of view, images of an object (subject) may be captured at various depths, and a zoom function may be implemented. In addition, even when a great zoom magnification is implemented, the thickness of the electronic device 300 may not increase.

In some implementations, the first camera module 305 may include a folded optical system, as shown in FIG. 3. The first camera module 305 may capture high-quality telephoto images using an image stabilization function implemented by rotating or tilting a first lens group and a reflection member. In addition, the first camera module 305 may include a second lens group that is arranged parallel to the length or width direction of the electronic device 300 for focus control, and a telephoto function, a macro function, and lens brightness may be easily adjusted while having substantially no influence on the thickness of the electronic device 300.

In FIG. 11, a key input device 317 may be disposed on the third surface 310C, such as the first regions 310D and/or the second regions 310E, of the housing 310. A connector hole 308 may accommodate a connector, and may be provided in the third surface 310C of the housing 310.

Figure 13:
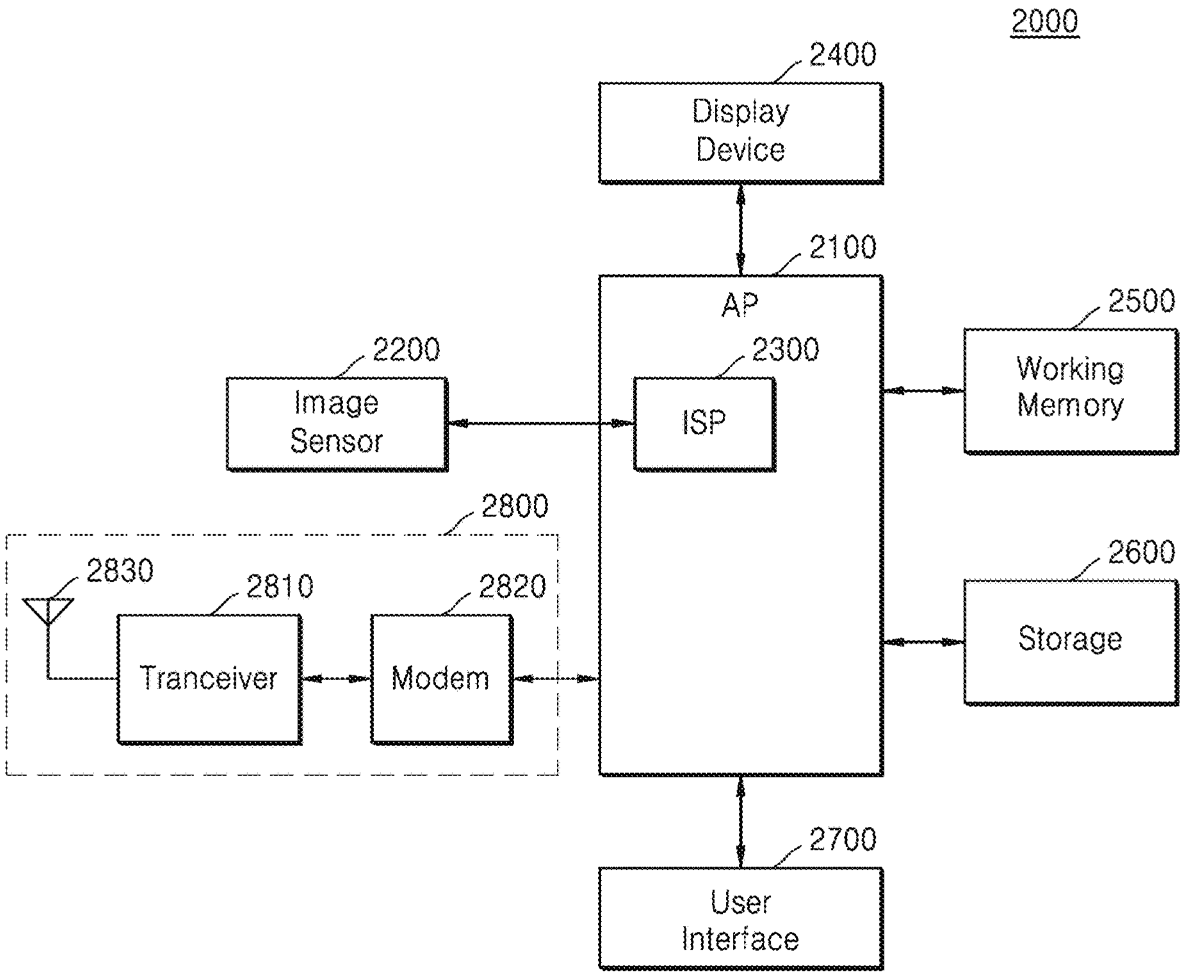
FIG. 13 is a block diagram illustrating an example of a portable terminal according to some implementations.

FIG. 13 is a block diagram illustrating an example of a portable terminal 2000 according to some implementations. In FIG. 13, the portable terminal 2000 may include an AP 2100, an image sensor 2200, a display device 2400, a working memory 2500, a storage 2600, a user interface 2700, and a wireless transceiver unit 2800. The AP 2100 may include an ISP 2300, in which the processor 12, as described above with reference to FIG. 1, may be used as the ISP 2300. The image sensor 230, as described with reference to FIG. 2, or the image sensor 450, as described with reference to FIG. 3, may be used as the image sensor 2200. In some implementations, the ISP 2300 may be implemented as an integrated circuit separate from the AP 2100.

The portable terminal 2000 may include a plurality of camera modules. The camera modules may be designed to have different fields of view for capturing images of objects at various depths and implementing a zoom function. In addition, even when a great zoom magnification is implemented, the thickness of the portable terminal 2000 may not increase.

In addition, at least one camera module included in the portable terminal 2000 may include a folded optical system, as shown in FIG. 3. The at least one camera module may capture high-quality telephoto images using an image stabilization function implemented by rotating or tilting a first lens group and a reflection member. In addition, the at least one camera module may include a second lens group that is arranged parallel to the length or width direction of the portable terminal 2000 for focus control, and a telephoto function, a macro function, and lens brightness may be easily adjusted while having substantially no influence on the thickness of the portable terminal 2000.

The AP 2100 may control the overall operation of the portable terminal 2000 and may be provided as a system on a chip (SoC) that runs an application program, operating system, etc. The AP 2100 may control operations of the ISP 2300, and converted image data that is generated by the ISP 2300 may be provided to the display device 2400 or may be stored in the storage 2600.

The image sensor 2200 may generate image data, such as raw image data, based on a received optical signal, and may provide the image data to the ISP 2300. The ISP 2300 may perform image data processing.

The working memory 2500 may be implemented as volatile memory, such as dynamic random access memory (DRAM) or static random access memory (SRAM), or non-volatile resistive memory, such as ferroelectric random access memory (FeRAM), resistive random access memory (RRAM), or phase-change random access memory (PRAM). The working memory 2500 may store programs and/or data that the AP 2100 processes or executes.

In some implementations, the storage 2600 may be implemented as a non-volatile memory device, such as Nand flash or resistive memory. For example, the storage 2600 may be implemented as a memory card, such as a multimedia card (MMC), an embedded multimedia card (eMMC), a secure digital (SD) card, or a micro-SD card, or the like. The storage 2600 may store data and/or programs regarding execution algorithms for controlling image processing operations of the ISP 2300, and when an image processing operation is performed, the data and/or the programs may be loaded into the working memory 2500. In some implementations, the storage 2600 may store image data generated by the ISP 2300, for example, converted image data or post-processed image data.

The user interface 2700 may be implemented using various devices capable of receiving user input, such as a keyboard, a touch panel, a fingerprint sensor, or a microphone. The user interface 2700 may receive user input and provide a signal corresponding to the received user input to the AP 2100.

In some implementations, the wireless transceiver unit 2800 may include a transceiver 2810, a modem 2820, and an antenna 2830.

While this disclosure contains many specific implementation details, these should not be construed as limitations on the scope of what may be claimed. Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a combination can in some cases be excised from the combination, and the combination may be directed to a subcombination or variation of a subcombination.

What is claimed is:

1. A camera module comprising:

a first lens group comprising at least one lens;

a reflection member configured such that light incident from the first lens group in a first direction is reflected by the reflection member in a second direction that crosses the first direction;

a second lens group comprising at least three lenses; and an image sensor configured to receive an optical signal passing through the second lens group and generate an electrical signal related to an image based on the optical signal, wherein the camera module satisfies $1.2<|f1/f|<3$, where f1 is a focal length of the first lens group, and f is a total focal length of an optical system comprising the first lens group and the second lens group, and wherein the second lens group comprises:

a third lens disposed adjacent to the reflection member, the third lens having negative refractive power;

a fourth lens having positive refractive power; and a fifth lens having positive refractive power.

2. The camera module of claim 1, wherein the first lens group comprises:

a first lens having positive refractive power; and a second lens having negative refractive power.

3. The camera module of claim 1, wherein the second lens group further comprises a sixth lens that is closer to the image sensor than the fifth lens is to the image sensor, and wherein the sixth lens has positive refractive power.

4. The camera module of claim 1, wherein the camera module satisfies $1<|f2/f|<2$, where f2 is a focal length of the second lens group, and f is the total focal length of the optical system comprising the first lens group and the second lens group.

5. The camera module of claim 1, further comprising an infrared cut-off filter between the second lens group and the image sensor, wherein the image sensor is further configured to generate the electrical signal from the optical signal by detecting light passing through the infrared cut-off filter.

6. The camera module of claim 1, wherein, in response to disturbance, the first lens group and the reflection member are configured to be tilted with respect to the first direction.

7. The camera module of claim 1, wherein, based on a position of an object, the second lens group is configured to be linearly moved in the second direction between the reflection member and the image sensor.

8. The camera module of claim 7, wherein the second lens group is closer to the reflection member when capturing a close-range image than when capturing a long-distance image.

9. The camera module of claim 7, wherein the second lens group is closer to the image sensor when taking a long-distance image than when taking a close-range image.

10. A camera module comprising:

a first lens group arranged in a first direction parallel to a side of an object, the first lens group comprising a first lens and a second lens;

a reflection member configured such that light incident in the first direction is reflected by the reflection member in a second direction that crosses the first direction;

a second lens group arranged in the second direction, the second lens group comprising a third lens, a fourth lens, and a fifth lens; and an image sensor configured to detect light passing through the second lens group, wherein the camera module satisfies $1<|f2/f<2$, where f2 is a focal length of the second lens group, and f is a total focal length of an optical system comprising the first lens group and the second lens group, and wherein the camera module satisfies $1.2<|f1/f<3$, where f1 is a focal length of the first lens group, and f is the total focal length of the optical system comprising the first lens group and the second lens group.

11. The camera module of claim 10, wherein the first lens has positive refractive power, and the second lens has negative refractive power.

12. The camera module of claim 10, further comprising an infrared cut-off filter between the second lens group and the image sensor, wherein the second lens group further comprises a sixth lens between the fifth lens and the image sensor, and wherein the image sensor is further configured to generate an electrical signal from an optical signal by detecting light passing through the infrared cut-off filter.

13. The camera module of claim 12, wherein the third lens has negative refractive power, the fourth lens has positive refractive power, the fifth lens has positive refractive power, and the sixth lens has positive refractive power.

14. The camera module of claim 10, wherein, in response to disturbance, the first lens group and the reflection member are configured to be tilted with respect to the first direction, and wherein, based on a position of the object, the second lens group is configured to be linearly moved in the second direction between the reflection member and the image sensor.

15. An electronic device comprising a plurality of camera modules comprising:

a first camera module having a first field of view; and a second camera module having a second field of view that is different from the first field of view, wherein the first camera module comprises:

a first lens group arranged in a first direction, the first lens group comprising at least two lenses;

a reflection member configured such that light incident in the first direction is reflected by the reflection member in a second direction that crosses the first direction;

a second lens group arranged in the second direction, the second lens group comprising at least three lenses; and an image sensor configured to receive an optical signal passing through the second lens group and generate an electrical signal related to an image based on the optical signal, wherein the first camera module satisfies $1.2<|f1/f|<3$, where f1 is a focal length of the first lens group, and f is a total focal length of an optical system comprising the first lens group and the second lens group, and wherein the first camera module satisfies $1<|f2/f|<2$, where f2 is a focal length of the second lens group, and f is the total focal length of the optical system comprising the first lens group and the second lens group.

16. The electronic device of claim 15, wherein:

the first lens group comprises a first lens and a second lens, the second lens group comprises a third lens, a fourth lens, a fifth lens, and a sixth lens, the first lens has positive refractive power, the second lens has negative refractive power, the third lens has negative refractive power, the fourth lens has positive refractive power, the fifth lens has positive refractive power, and the sixth lens has positive refractive power.

17. The electronic device of claim 15, wherein, in response to disturbance, the first lens group and the reflection member are configured to be tilted with respect to the first direction, and wherein, based on a position of an object, the second lens group is configured to be linearly moved in the second direction between the reflection member and the image sensor.

* * * * *